く12) United States Patent
Holt et al.

(10) Patent No.: US 11,216,347 B1
(45) Date of Patent: Jan. 4, 2022

(54) AUTOMATICALLY LOCATING RESOURCES USING ALTERNATIVE LOCATOR EXPRESSIONS DURING HETEROGENEOUS COMPONENT-BASED TESTING IN A PORTABLE AUTOMATION FRAMEWORK

(71) Applicant: Spirent Communications, Inc., San Jose, CA (US)

(72) Inventors: Andrea Holt, Ijamsville, MD (US); Saif Ahmed, Fairfax, VA (US); Alireza Akbari McQuee, Centreville, VA (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 17/003,962

(22) Filed: Aug. 26, 2020

(51) Int. Cl.
  *G06F 11/36* (2006.01)
  *G06F 11/20* (2006.01)
  *G06F 9/451* (2018.01)
  *G06F 11/32* (2006.01)

(52) U.S. Cl.
  CPC ......... *G06F 11/2023* (2013.01); *G06F 9/451* (2018.02); *G06F 11/321* (2013.01); *G06F 11/3688* (2013.01); *G06F 11/3692* (2013.01)

(58) Field of Classification Search
  CPC .. G06F 11/36; G06F 11/3688; G06F 11/3668; G06F 11/3684; G06F 11/3692; G06F 11/3672; G06F 11/3676; G06F 9/451; G06F 11/321; G06F 11/3664; G06F 11/3696; G06F 16/986; G06F 16/958
  See application file for complete search history.

(56) References Cited

U.S. PATENT DOCUMENTS

| | | | |
|---|---|---|---|
| 10,620,975 B1* | 4/2020 | Zohar | G06F 3/0484 |
| 2011/0307865 A1* | 12/2011 | Grieves | G06F 11/3676 717/124 |
| 2013/0086560 A1* | 4/2013 | Shen | G06F 11/3688 717/131 |
| 2015/0370688 A1* | 12/2015 | Zhang | G06F 11/3688 717/125 |

\* cited by examiner

*Primary Examiner* — Yolanda L Wilson
(74) *Attorney, Agent, or Firm* — Haynes Beffel & Wolfeld LLP; Andrew Dunlap

(57) ABSTRACT

The disclosed technology provides resource locators keyed to resource names with failover alternate resource locators keyed to resource positions on user interfaces in a test environment: providing a central repository for resource locators and storing a set of alternative locator expressions for a resource in the central repository. The set includes first resource locators keyed to resource names on UIs and respective second resource locators keyed to resource positions on UIs that can be evaluated when the resource name in the respective first resource locator is invalid. The method invokes a resource location navigator to locate a particular resource using a first resource locator keyed to a resource name on the user interface, automatically invoking the resource location navigator using the second resource locator keyed to the resource position after failure of locating the particular resource using the resource name, and accessing the particular resource using the second resource locator.

21 Claims, 25 Drawing Sheets

```
ⓒ ProbeSteps.java ×  ⓒ ScenarioHelper.java ×
196
197  @BeforeStep
198 ○ @  public void beforeStep(ExecutionContext context) { updatesSt
201
202        @AfterStep
203 856  public void afterStep() { System.out.println(" "); }
206
207        @AfterScenario
208 866  public void afterScenario() { . . . }
213
214        @AfterSuite
215 876  public void afterSuite() {
216 ○       updateReportWithSummary();
217         cleanUpHelper.cleanUpAfterSuite();
218         if (runInfo.test.config.isUiMode()) {
219           LOGGER.info("AfterSuite: Closing the driver");
220 ○         closeDriver();
221        }
222
223      }
224      public void addToScenarioDataStore(String key, Object Value
227
228      }
231      public object getFromScenarioDataStore(String Key) { return
232
233
```

```
ⓒ ProbeSteps.java ×  ⓒ ScenarioHelper.java ×
110
111      switch (stepPrefix) {
112        case "GIVEN":
113 822      setCurrentStepType(StepType.SETUP);
114          break;
115        case "WHEN":
116 832      setCurrentStepType(StepType.TEST);
117          break;
118        case "THEN":
119 842      setCurrentStepType(StepType.VERIFY);
120          break;
121        case "AND":
122 852      if (StepType.NONE.equals(getcurrentStepType())) {
123            throw new IllegalArgumentException("can't have AND
124          }
125          break;
126        default:
```

812A

ScenarioHelper > beforeSuite()  ⟵ 862

FIG. 8A

```
10
11    @Service
12    Public class AuthenticationSteps {
13
14        @Autowired
15        CleanUpHelper cleanUpHelper;
16
17        @Autowired
18        TasksFactory tasksFactory;
19
20        @ReUsable
21        @Step({"GIVEN admin is authenticated",
22               "WHEN admin is authenticated",
23               "THEN admin is authenticated",
24               "AND admin is authenticated"})
25        public void adminLogsIn() {
26            cleanUpHelper.add( ( ) -> tasksFactory.get(AuthTasks.class) .removeUser( userRole: "admin"));
27
28            tasksFactory.get(AuthTasks.class) .login( userRole: "admin");
29        }
30
31        @Step({"GIVEN test_user is authenticated", AuthenticationSteps » adminLogsIn()
```

```
ⓒ ProbeSteps.java    ✕
12   @Service
13   Public class ProbeSteps {
14
15       @Autowired
16       TasksFactory tasksfactory;
17
18       @Autowired
19       private CleanUpHelper cleanUpHeper;
20
21       @ReUsable
22       @Step({"GIVEN user registers <probeName> probe",
23               "WHEN user registers <probeName> probe",
24               "THEN user registers <probeName> probe",
25               "AND user registers <probeName> probe"})
26       public void registerProbe(String probeName) {
27           cleanUpHelper.add( ( ) -> tasksFactory.get(VtaTasks.class) .deleteVtatasks
28           cleanUpHelper.add( ( ) -> tasksFactory.get(ProbeTasks.class) .deleteProbe
29
30           tasksFactory.get(ProbeTasks.class).registerProbe(probeName);
31           tasksFactory.get(VtaTasks.class).addProbeVtaToManagement(probeName
32       }

ProbeSteps      »   registerProbe()
```

1012 — ProbeSteps.java
1042 — @ReUsable
1062 — (step annotation)

```
# controller info ———————— 1112
controller:
  ssl:
    enabled: true
  sso:
    enabled: true
  domain:
    addr: 10.32.xx.xx
    uid: username
    pwd: password
  oauth2:
    client-id: xx
    client-secret: xx
    grant-type: xx test runner info ———————— 1114
test:
  # test configuration
  config:
  #   mode: api
      mode: ui
  ui:
    headless: false
    browser:
      name: chrome
      version: stable
    # version: latest
    webdriver:
      pageload-tmo-secs: 300
      script-tmo-secs: 300
      implicit-wait:
        enabled: false
        tmo-secs: 10
      explicit-wait-secs: 10 test resource info ———————— 1118
resource:
  # virtual testing platform
  vtp:
    client:
      serial: 08XXXXXXX
      addr: 10.xx.xx.xx
    server:
      serial: 08XXXXXX0
      addr: 11.xx.xx.xx kernel based VM ———————— 1158
kvm:
  juniper:
    client-addr: xx.xx.xx.xx
    server-addr:
  dell:
    client-addr:
    server-addr:
  hp:
    client-addr:
    server-addr:

# vta specific resource ———————— 1178
vta:
  twamp:
  y1564:
  iperf:
  rfc6349:
  l3-pktloss:
  dns:
    server:
      addr: xx.xx.xx.xx
```

FIG. 11 test-menu
right-menu-branch-item: xpath://li[./span[text( )='%s'] and not(contains(@class, 'rerunnable'))]//span[text( )='%s']
 ← 1226 test-input-output ← 1236
test-parameters-block: xpath:.//div[@class='block-group']/span/a[contains(text( ),'%s')]/../..
test-parameters-input: xpath:.//div[not(contains(@class, 'hidden'))] /*[contains(text( ),'%s')]/../following-sibling:
test-parameters-checkbox: xpath:.//span/a[contains(text( ), '%s')]/../label[@rel='tooltip']  ← 1248
test-confirm-button: xpath:.//button[@data-event='confirm']
 ↑
 1256

FIG. 12E

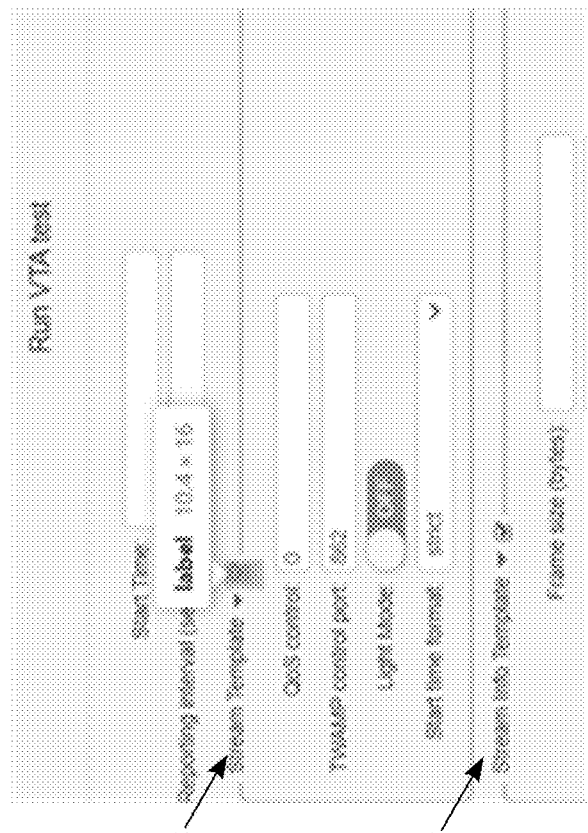

FIG. 12F

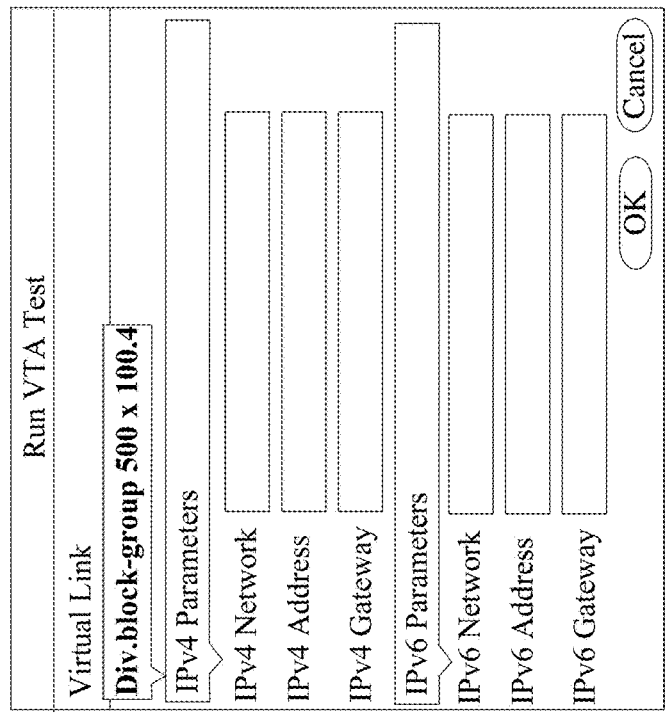

FIG. 12G

```
@Override
public void registerprobe(String probeName) {
    Probe probe = probeAction.registerProbe(loadProbeFromFile(probeName),
3000, 20)
            .onErrorMap(e -> new
VsaIssueException(IssueType.API.HTTP_SERVER_ERROR, e, "Unable to register
probe " + probename))
            .block ();
    FailureHelper . checkNotNull(probe, new
VsaIssueException(IssueType.Common.POTENTIAL_DEFECT, "Unable to register probe " + probeName));  ← 1544

LOGGER.info("probe {} is READY", probeName);
} public <T> List<T> LoadListFromResource(String resourcePath, Class<T> clazz) {
    List<T> models = loadFromResourceHelper(resourcePath, clazz);
    if (model.is empty( ) ) {
        throw new environmentIssueException(IssueType . TestSetup . RESOURCE_NOT_FOUND,
"Resource: " + resourcePath + " not found, or does not contain a matching .json or
.yml file for the given model");  ← 1574
    }
    return models;
}
```

FIG. 15

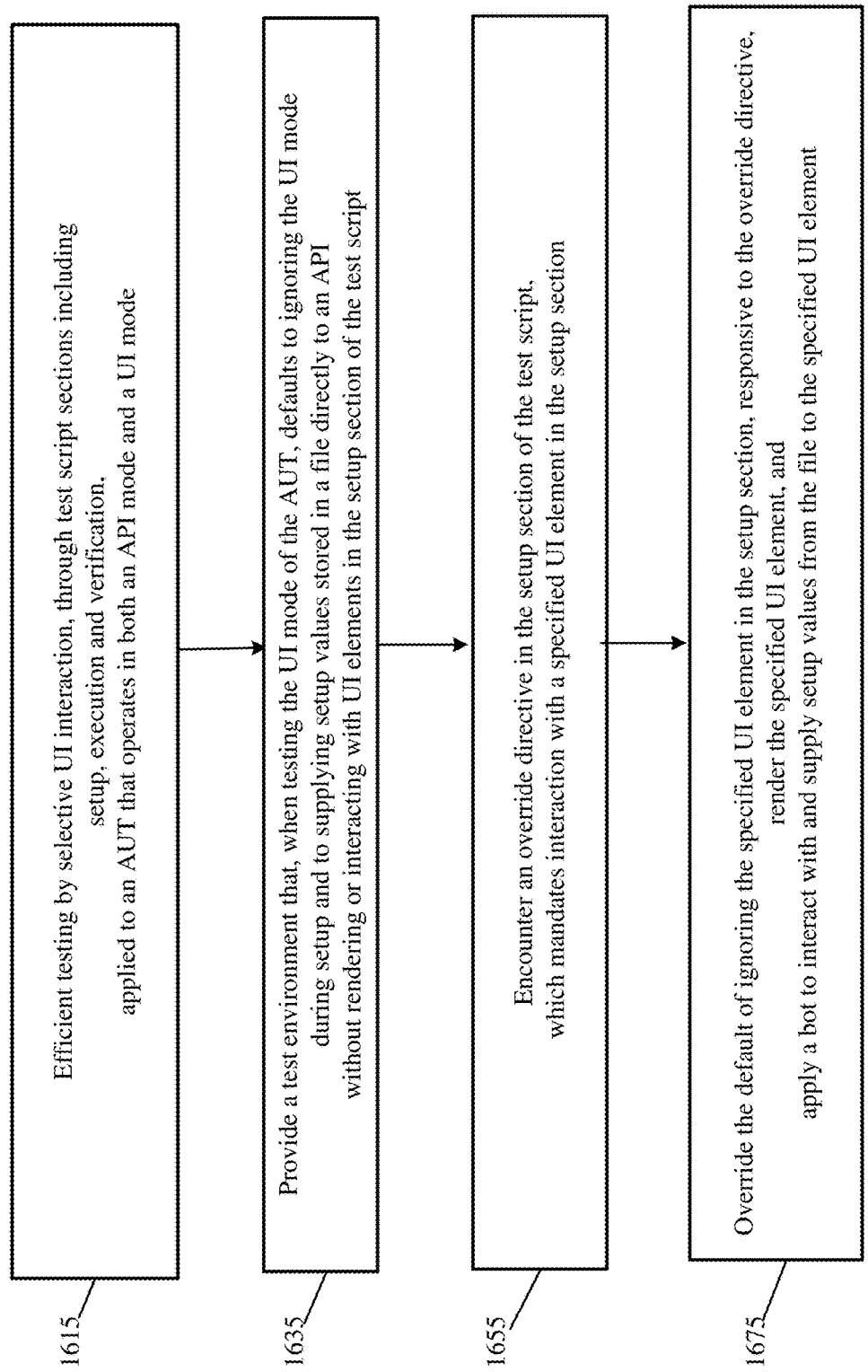

AUTOMATICALLY LOCATING RESOURCES USING ALTERNATIVE LOCATOR EXPRESSIONS DURING HETEROGENEOUS COMPONENT-BASED TESTING IN A PORTABLE AUTOMATION FRAMEWORK

RELATED

This application is related to US Patent Application entitled "CONTROLLING HETEROGENEOUS COMPONENT-BASED TESTING IN A PORTABLE AUTOMATION FRAMEWORK WITH TEST SCRIPTS IN BOTH API MODE AND UI MODE," Ser. No. 17/003,958 filed contemporaneously. The related application is incorporated by reference for all purposes.

This application is related to US Patent Application entitled "REUSING PROVISIONED RESOURCES DURING HETEROGENEOUS COMPONENT-BASED TESTING IN A PORTABLE AUTOMATION FRAMEWORK," Ser. No. 17/003,959 filed contemporaneously. The related application is incorporated by reference for all purposes.

This application is related to US Patent Application entitled "MAPPING TEST PARAMETER DATA ELEMENTS DURING HETEROGENEOUS COMPONENT-BASED TESTING IN A PORTABLE AUTOMATION FRAMEWORK IN BOTH API MODE AND UI MODE," Ser. No. 17/003,961 filed contemporaneously. The related application is incorporated by reference for all purposes.

This application is related to US Patent Application entitled "CUSTOMIZED CATEGORIAL ERROR HANDLING FRAMEWORK FOR HETEROGENEOUS COMPONENT-BASED TESTING IN A PORTABLE AUTOMATION FRAMEWORK," Ser. No. 17/005,964 filed contemporaneously. The related application is incorporated by reference for all purposes.

FIELD OF THE TECHNOLOGY DISCLOSED

The technology disclosed relates generally to end-to-end test automation. More specifically, the technology discloses controlling heterogeneous component-based testing in a portable automation framework with test scripts in both API mode and UI mode. Disclosed is technology for multiple test execution modes, reusable and just-in-time provisioning steps, mapping of a user interface template to API schema, specification and invocation of alternate and failover resource locators, and a custom exception handling framework.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

In a hierarchical telecommunications network, the backhaul portion of the network comprises the intermediate links between the core network, or backbone network, and the small subnetworks at the edge of the network. Testing of the backhaul network for quality of service (QoS), reliability and compliance with telecom regulations is required. As networks evolve quickly over time with updated designs, increased user demand and changing technology, the benchmarking of updated and newly implemented hardware is required to enable designers to quickly configure network systems for their customers.

As designs change quickly, so too does the demand for making new tests and updates to existing tests. Test equipment functionality needs to support accurate testing of the updated network designs quickly, to support everchanging network technology.

An opportunity arises for multiple test execution modes, reusable and just-in-time provisioning steps, mapping of a user interface template to API schema, specification and invocation of alternate and failover resource locators, and custom exception handling. The disclosed technology improves testing flexibility while ensuring reliability throughout the automation lifecycle.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches five distinct sets of innovations for an end-to-end test automation platform. Using the disclosed test automation platform frees the test script writer from the need to think about best practices when developing a suite of tests, due to prior test setup by an automation engineer. The first innovation teaches efficient testing by selective UI interaction, through test script sections including setup, execution and verification, applied to an application under test (AUT) that operates in both an application programming interface (API) mode and a user interface (UI) mode. This includes providing a test environment that, when testing the UI mode of the AUT, defaults to ignoring the UI mode during setup and to supplying setup values stored in a file directly to an API without rendering or interacting with UI elements in the setup section of the test script. The method also includes encountering an override directive in the setup section of the test script, which mandates interaction with a specified UI element in the setup section. and responsive to the override directive, overriding of the default of ignoring the specified UI element in the setup section, rendering the specified UI element, and applying a bot to interact with and supply setup values from the file to the specified UI element.

Second, for utilizing already provisioned components in a test scenario, without need to purge and re-provision the already provisioned components, the disclosed technology includes interpreting first and second sections of a test script. In the first section, upon encountering a reusable-resource-tag and a first instance of requesting provisioning of an associated resource, the method includes provisioning the associated resource and designating the associated resource as reusable. In the second section, upon encountering a second instance of requesting provisioning of the associated resource, the method includes determining that the associated resource was designated as being reusable, and reusing an already provisioned instance of the associated resource instead of provisioning a new instance and instead of destroying the already provisioned instance and re-provisioning the associated resource.

Third, for testing with a test parameter data structure, applied to an AUT that operates in both an API mode and a user interface UI mode, the disclosed method teaches processing a test script that is configurable to test the AUT in the API mode and also in the UI mode. The UI mode renders and interacts with UI elements utilizing test values stored in elements of the test parameter data structure, and the test parameter data structure is used by the test script in both the API mode and in the UI mode. The method also includes providing display mark-up in the test script that is rendered in the UI mode and that formats fields in a display or parts of the display to receive data that map to specific elements in the test parameter data structure, but which display mark-up leaves to be completed a mapping connection between the fields in the display and the specific elements in the test parameter data structure. Further included is providing a data mapping that maps the fields in the display mark-up to the elements in the test parameter data structure, based on names of the elements. While processing the test script in the UI mode, the method also includes rendering the display mark-up from the test script, using a bot to programmatically interact with and complete the display mark-up, applying the data mapping to identify the elements in the test parameter data structure to be used to complete the fields in the display mark-up, and causing processing of the completed fields in the display mark-up.

Fourth, for providing resource locators keyed to resource names with failover alternate resource locators keyed to resource positions on user interfaces in a test environment, the disclosed technology includes providing a central repository for resource locators, storing a set of alternative locator expressions for a resource in the central repository, in which the set includes first resource locators keyed to resource names on user interfaces and respective second resource locators keyed to resource positions on user interfaces that can be evaluated when the resource name in the respective first resource locator is invalid. The disclosed method includes invoking a resource location navigator to locate a particular resource using a first resource locator keyed to a resource name on the user interface, automatically invoking the resource location navigator using the second resource locator keyed to the resource position after failure of locating the particular resource using the resource name, and accessing the particular resource using the second resource locator. Additional successive locators are also disclosed.

Fifth, disclosed is enhancing error messages from tests, including providing an error annotation memory in which to store annotations of errors for reference upon recurrence of the errors. Following one or more tests, the method includes parsing an error log and causing display to the user of one or more errors including error codes. The method also includes receiving from the user, for at least some of the errors, a respective error source category and/or problem resolution hint and storing an error code and the respective error source category and/or problem resolution hint, received from the user, as an annotation in the error annotation memory. The method further includes receiving a subsequent error including a subsequent error code, correlating a subsequent error code with the error source category and/or problem resolution hint available from the error annotation memory, and enhancing a message accompanying the subsequent error and causing display of the enhanced message.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 5 shows the selected UI input form in YAML displayed in the upper center area of the test interface screen.

FIG. 6 shows a left column of the platform interface with automation-resources, including tests and far right elements, in this case showing the default parameters file for a Y1564 probe test.

FIG. 8A and FIG. 8B show snippets of a scenario helper file.

FIG. 8A shows a set of "before" suite configurations for setup using the "given" keyword, test with the "when" keyword, and verify triggered via the "when" keyword.

FIG. 8B shows configuration steps for "after" step, after scenario and after suite.

FIG. 9 shows an example of "reusable" functionality for authenticating a test administrator, with a snippet of authentication steps for the automation interface.

FIG. 10 depicts a second example of "reusable" functionality, listing a snippet of probe steps code for registering the probe and specifying the cleanup helper.

FIG. 11 lists operational settings with example configuration variables that specify the resources for test scenarios for an application under test in a run configuration file, in yet another markup language (YAML).

FIG. 12E shows an example XPath usable to locate a right menu branch item based on the name of the menu item in the UI.

FIG. 12F shows an example of fields with checkbox input format.

FIG. 12G depicted a Run VTA Test popup dialog box for a TWAMP test.

FIG. 15 lists code snippets for capturing errors for customized exception handling in the framework.

FIG. 16 shows a representative method of efficient testing by selective UI interaction, through test script sections including setup, execution and verification, applied to an application under test (AUT) that operates in both an application programming interface (API) mode and a user interface (UI) mode.

DETAILED DESCRIPTION

Figure 1A:
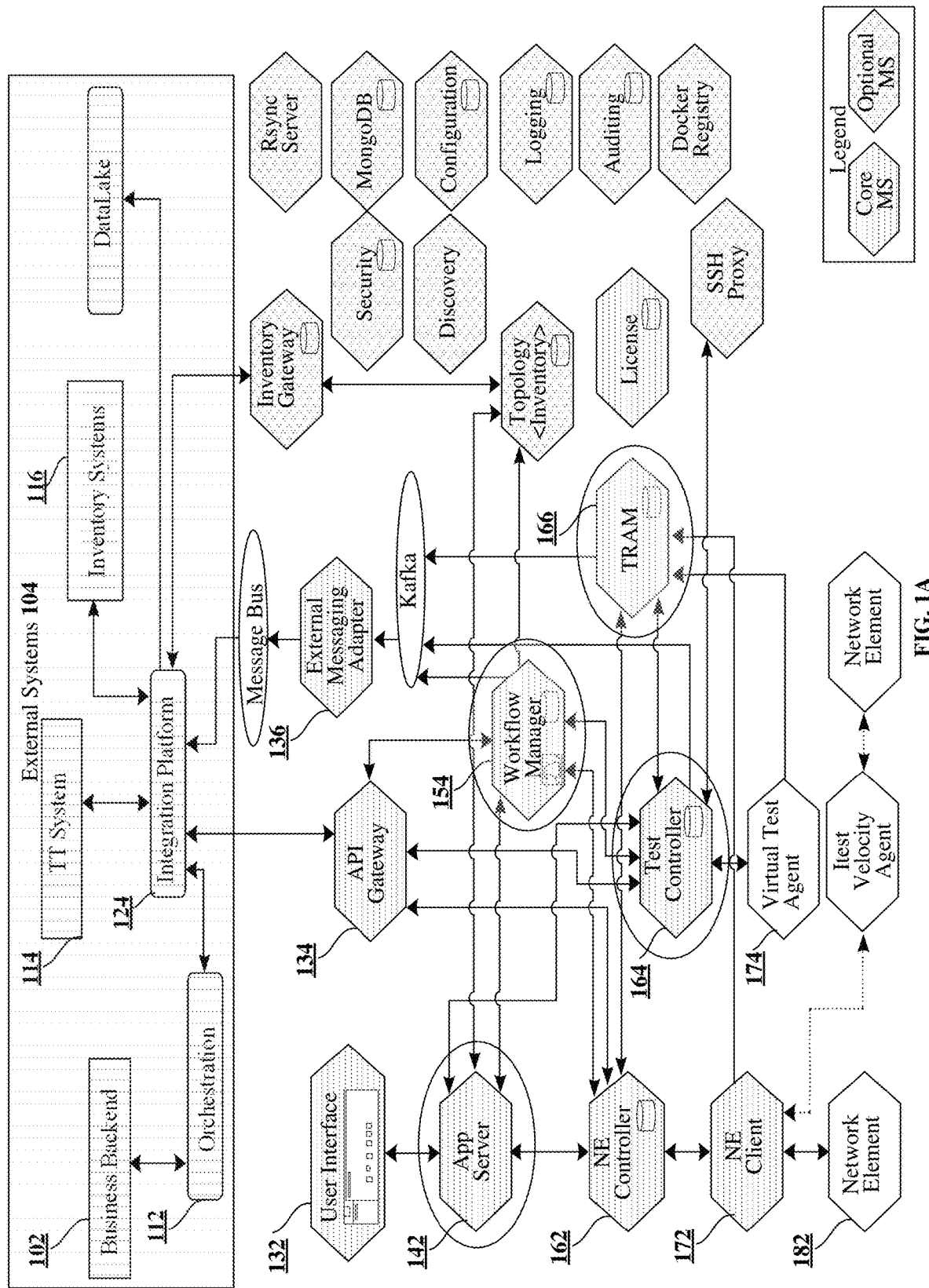
FIG. 1A shows an overview of a test environment that supports an application programming interface (API) mode and a user interface (UI) mode that apply across test stages of setup, execution and verification for testing a system.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Scenario-based testing for hardware and virtual ports makes it feasible to provide network answers efficiently, as hardware configurations evolve and new network packages are added regularly. Existing testing frameworks require users to write user interface (UI) or application programming interface (API) based tests, with the test completed from either the UI or API perspective. Users must write two distinct test scripts, even if they need to test the same functionality in both the UI and the API.

Invoking a script that uses a parameter file to control a test is a best practice for repeatable component testing. Some test systems accept a user configuration of whether to invoke user interfaces for specific parts of a test; that is, for setup, testing or verification of results. But these systems can be configured to view by invoking a user interface (UI) as a suggestion from the user, rather than a directive.

The technology disclosed forces a test script processor to follow a user configuration that selects an API mode or a UI mode as a directive, instead of a suggestion. It overrides script processing logic intended to protect a user from design mistakes. The disclosed feature is a directive or flag embedded in a script that specifies a block of scripting to which a configuration that selects one mode over the other is followed without exception. This directive can, for instance, be implemented as an @TestModeExec statement that precedes and annotates a block of scripting subject to the statement. The scope of the executive test mode can be explicitly specified, such as by use of brackets or other opening and closing marks, or implicitly, based on a code structure that immediately follows the statement.

Users/clients often interact with software through a user interface (UI). The disclosed test framework is utilized for developing testing of client scenarios in advance, to ensure the client's system is going to function as expected. This meta-testing typically includes using a bot to programmatically imitate user interactions with a software product. Many kind of tests include a quality assurance (QA) process, such as the tests written using the disclosed test framework.

The technology disclosed provides a test harness that can be used for pre-deployment testing or for regression testing, after deployment, when changes are made to a network to which the application under test and test harness are deployed. For a customer in a production environment, the disclosed technology can be utilized for testing a product upgrade during an upgrade window.

Testing the application under test (AUT) takes place in three phases: set-up, testing and verification. After deployment, users have the option to run tests in a so-called UI mode, which presents user interfaces during all three phases, or in an API mode, which runs silently and produces results in log files. Both the UI and API modes are subject to pre-deployment and regression testing.

When a UI is exercised and tested using the test harness, a harness component invokes and scrapes a before test stimulus version of a UI, executes a test stimulus, then reinvokes and re-scrapes the UI. A DIF determines differences between the two scraped versions.

Testing of the AUT in UI mode runs more quickly without loss when the UI is suppressed during the setup phase, because rendering of UIs and bot interaction with the UIs requires considerable resources without producing important test results. Thus, the test harness default is to ignore UI mode in the set-up phase. This default can be overridden.

The technology disclosed introduces an @TestExecMode directive applicable to a block in a test script, which locally cancels the default behavior of ignoring the UI mode and forces rendering and scraping of the UI even during the setup phase. The test harness operation is slowed by script blocks marked with @TestExecMode, so cautious usage is urged.

For consistency between UI mode testing and API mode testing, a common, shared file of values (such as a JSON key-value file) delivers values used during both the UI and the API modes. An intermediate map for display resolves differing requirements of the modes. For instance, a UI may require a user to repeat entry of a password, email address registration or some other critical piece of information, as a typing accuracy check, while an API would assume it to be correctly entered. As a result, the intermediate map assigns a password value to two fields, such as repeated fields for a new password and a retyped the new password. The intermediate map bridges values kept and updated in the common with a bot and UI during UI mode.

The disclosed technology solves the problem of running a same test script in either UI mode or API mode even though the way data is entered for those tests is very different. The technology disclosed allows for creating a single test script that is controlled via configuration. When a test script designer does not need to make configuration changes, setup is faster because it can be completed in API mode.

Controller testing often involves dozens of tests and can even involve a thousand or more tests. Each test in a test scenario requires provisioning of components used to exercise the controller under test. These components must be provisioned before a test can run.

Two approaches have evolved for provisioning components used in a test scenario. One approach is for an initialization module to over-provision all components that reasonably might be needed for a broad scenario. This requires a longer time for provisioning and more resources than actually needed to conduct a test. Another approach is to clear provisioned resources and re-provision just those resources needed for a single test in a test scenario. This involves excessive purging and re-provisioning. For instance, consider the provisioning involved when running 500 tests against a controller.

Disclosed technology extends a test scripting language to specification of whether a provisioned test component is reusable. Each time an interpreter encounters a component provisioning statement, it checks to see if the component already has been provisioned for a current test session. If the component is already loaded, it checks whether the component has been marked reusable. The reusable flag is controlled by an explicit statement.

Designation of test components as reusable supports just-in-time provisioning of test components, instead of over-initialization at the beginning of the test scenario. This allows some tests to begin earlier and reduces the provisioning required for relatively modest test scenarios. It also reduces any tendency to purge and re-provision resource banks, especially resource banks which mix reusable and non-reusable test components.

If a reusable test component has already been provisioned and marked reusable, then the script can proceed without purging or re-provisioning the test component. The reusable modifier for component provisioning allows a test developer to distinguish between components that need provisioning of a fresh instance and components that can be reused, if already provisioned. Optionally, if the script statement that specifies that the component is reusable includes a state setting parameter, a corresponding state of the reusable component is set as specified, without need to purge and re-provision the test component.

Systems undergo continuous refinement. Small details change frequently, such as correction of typographical errors in user interface components and in data structure names. Often, different people are responsible for correcting small mistakes rather than for managing overall updates to test protocols. It is easy for small, seeming local corrections in one place to break test scripts, unintentionally.

The technology disclosed addresses the problem of resource renaming and divergence between data structures and user labels on user interfaces in a test environment. The disclosed technology supports specification and invocation of alternate and failover resource locators. Name and position-based locators are supported, keyed to resource names and to resource positions in a parsed data structure. When an attempt to locate a resource using a fully qualified resource name fails, the technology disclosed automatically invokes an alternate resource locator. One style of alternate resource locator that operates by position is an XPath expression. This navigation syntax can be applied to JSON, XML or other hierarchical, parsable data structures. Multiple locator expressions can be successively specified. The first locator expression in a group that succeeds is used. An error results only when none of the available locator expressions succeed.

Experienced developers gain a knack for looking at an error message and recognizing or guessing at the root cause of the error. Their pattern recognition and experience bridge the gap between error messages and problem resolution.

The technology disclosed interposes an error annotation layer, in which test developers can annotate intercepted errors and exceptions with a source category and a problem resolution hint. A custom exception handler intercepts exceptions in place of other exception handling or by post processing other exception handling. It categorizes and delivers hints to the collected exceptions. For instance, error sources can be categorized as test automation issues, test environment issues, and device under test issues. The hint can be error-specific, and can provide a way of codifying knowledge of error resolutions.

The original exception needs to remain available for viewing, in addition to the classification and the hint, if any. The exception handling layer can collect a variety of state information, including a call stack leading to invocation of the module that generated the exception. Classification and hint annotation can be tied to state information, in addition to the particular exception.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:
API Application Programming Interface
ATP Automated Test Project
AUT Application Under Test
DNS Domain Name System
   A fully qualified domain name specifies its exact location in the
FQDN
   tree hierarchy of the DNS
JSON JavaScript Object Notation
NE Network Element
NFV Network Function Virtualization
QoS Quality of Service
SDN Software Defined Network
TRAM Test Results Analysis Module TWAMP Two-Way Active Measurement Protocol
UI User Interface
VNF Virtual Network Function
VSA Virtual Service Assurance
VTA Virtual Test Agent
VTP Virtual Test Platform
XPath Path expression for finding an element on a web page FIG. 1A shows an overview of a test environment that supports an application programming interface (API) mode and a user interface (UI) mode that apply across test stages of setup, execution and verification for testing a system. The test environment is a virtual service assurance (VSA) solution for network function virtualization (NFV) and software defined networks (SDN), comprised of microservices designed to run on general hardware platforms according to common network function virtualization (NFV) concepts. Core test environment components can include controller microservices: test controller 164, test results analysis module (TRAM) 166, workflow manager 154, user interface (UI) 132 and API gateway 134. AppServer 142 is the UI version of application under test (AUT). Controller 164 provides VTA configuration, test initiation and results management services as well as UI hosting, configuration data management and APIs for integration with external systems, such as integration platform 124. TRAM 166 manages test and NE administration results, acting as a hub to receive results from any test or NE administration action, and inserting results into the database. Workflow manager 154 manages workflow execution. UI 132 is an access point of AppServer 142 via the user interface, from which users can exercise use cases. Users can also exercise use cases via API using microservices. A different set of microservices can be included in the test environment in a different implementation of the disclosed technology.

FIG. 1A also shows example external systems to illustrate context for the test environment. Related external systems 104, lightly shaded with vertical bars, include services such as a business backend 102, orchestration 112 for instantiating, managing, and chaining Virtual Network Functions (VNFs), integration platform 124, trouble ticketing system 114 for tracking internal problems and customer-reported issues, and inventory systems 116 for managing resources and provisioning automation.

Figure 1C:
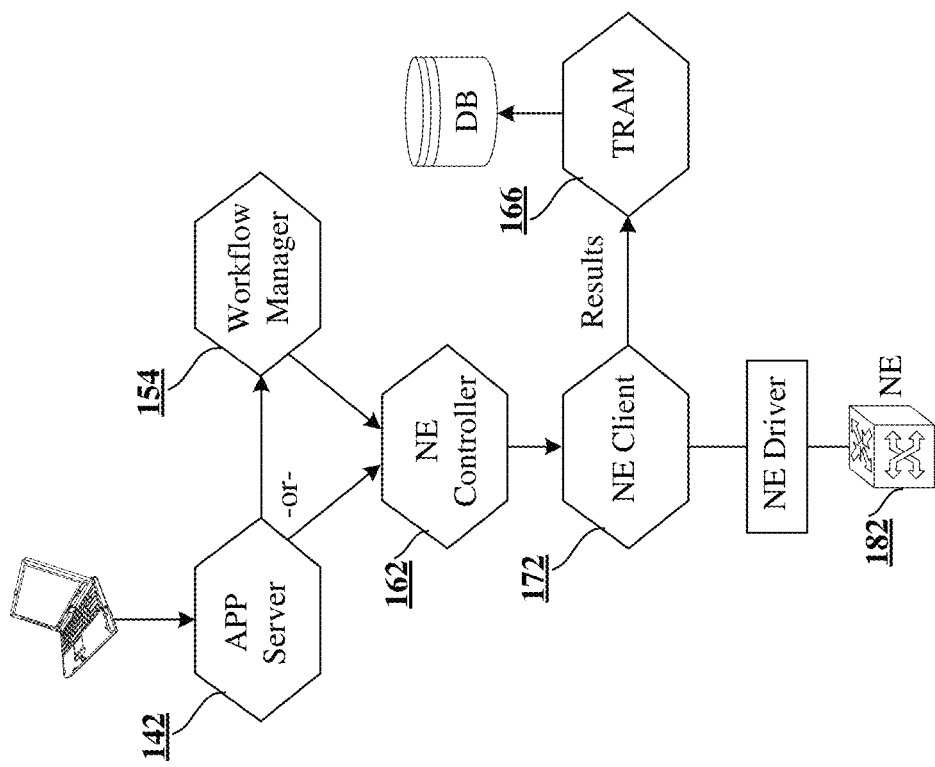
FIG. 1C shows a simplified example of the microservices involved with testing for an external network element (NE).
Figure 1B:
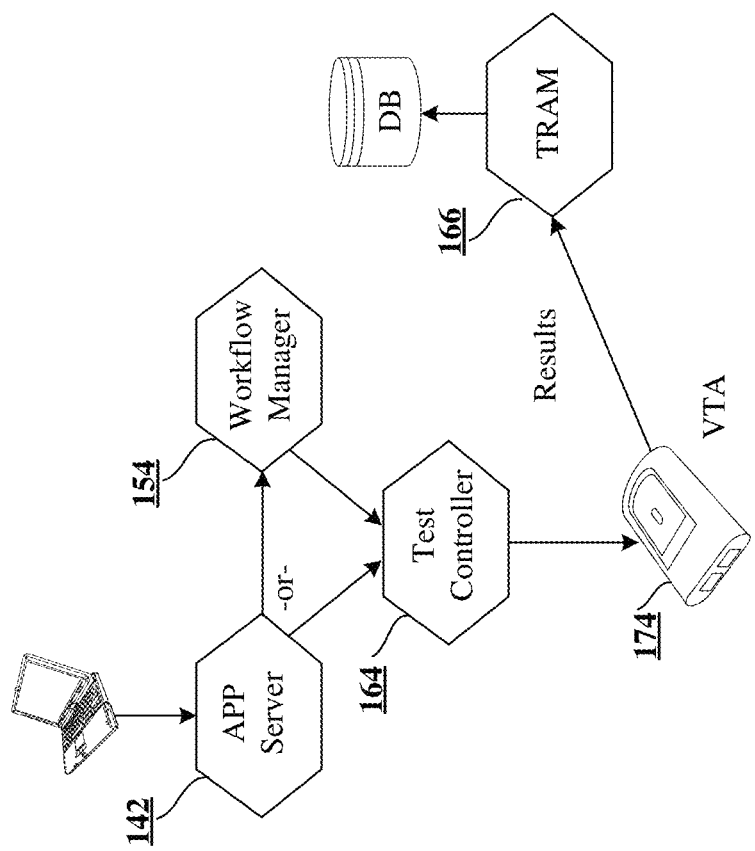
FIG. 1B highlights core architecture, in which components are virtual machines (VMs) or containerized applications running on generic servers or virtual test platform (VTP) devices.

FIG. 1B highlights core architecture, in which components are virtual machines (VMs) or containerized applications running on generic servers or virtual test platform (VTP) devices. The system can integrate testing with dedicated hardware and legacy systems in some implementations. FIG. 1B shows a simplified example of the microservices involved with virtual test agent (VTA) testing for a UI initiated test. Once a VTA 174 is registered with the system, it is ready to run tests. Testing may be initiated by AppServer 142, based on a request from a test controller UI user. The UI can initiate direct on-demand testing or it can start a workflow. Alternatively, workflow manager 154 can initiate a test due to a testing step within a workflow script. In the case of a workflow, workflow manager 154 becomes the intermediary that communicates with test controller 164, based on the instructions within the workflow script. In a third testing scenario, a direct call to test controller 164 from an external entity can initiate a test, for advanced troubleshooting purposes. Test controller 164 runs the testing operation in the three scenarios.

FIG. 1C shows a simplified example of the microservices involved with testing for third-party network element (NE) 176. For UI users, AppServer 142 initiates a session with NE controller 162, which is similar in operation to a session with test controller 164 that controls VTA testing. In another scenario, AppServer 142 starts a workflow with a step that involves NE administration, then workflow manager 154 initiates the session. NE controller 162 formats the administration request and sends it to NE 176. From the perspective of subsequent system communication, NE client 172 appears similar to a VTA 174. NE client 172 loads the appropriate device-specific NE driver and negotiates with NE 182. Like a VTA, NE client 172 reports results to TRAM 166, which NE controller 162 monitors to manage the session.

Next, we describe an example architecture for an end to end test automation framework with disclosed multiple test execution modes, reusable and just-in-time provisioning steps, mapping of a user interface template to API schema, specification and invocation of alternate and failover resource locators, and custom exception handling.

Architecture

Figure 2:
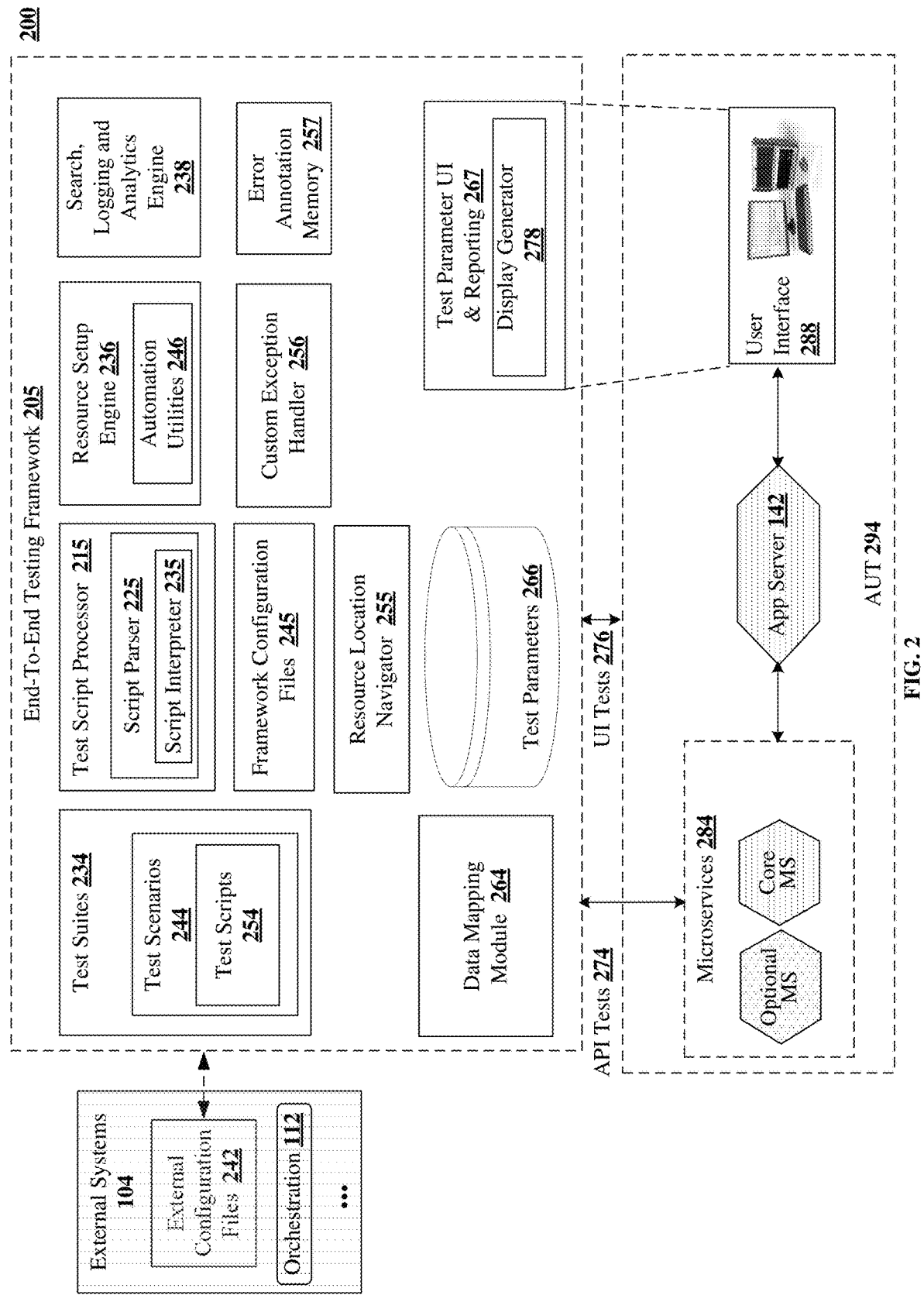
FIG. 2 depicts an exemplary architecture for an end-to-end test automation framework with disclosed multiple test execution modes, reusable and just-in-time provisioning steps, mapping of a user interface template to API schema, specification and invocation of alternate and failover resource locators, and custom exception handling, according to one implementation of the technology disclosed.

FIG. 2 shows example architecture 200 for an end-to-end test automation framework with disclosed multiple test execution modes, reusable and just-in-time provisioning steps, mapping of a user interface template to API schema, specification and invocation of alternate and failover resource locators, and custom exception handling. Because FIG. 2 is an architectural diagram, certain details are intentionally omitted to improve clarity of the description. The discussion of FIG. 2 will be organized as follows. First, the elements of the figure will be described, followed by their interconnections. Then, the use of the elements in the system will be described in greater detail.

Architecture 200 has portable end-to-end (E2E) testing framework 205 with capabilities to interact with VSA core microservices (MS), such as test controller 164 as well as with third party components and optional microservices. E2E testing framework 205 is connected to an application under test (AUT), to VSA core components, such as test controller 164, app server 142, workflow manager 154 and TRAM 166, described relative to FIG. 1A earlier. External systems 104 with third-party components such as orchestration 112 can provide external configuration files 242 that specify test configurations for use by E2E testing framework 205. Orchestration 112 can utilize Blue Planet for automated NFV instantiation and chaining of VNFs in one implementation and can utilize a different orchestration system in another implementation.

E2E testing framework 205 utilizes test script processor 225 with script interpreter 235, test suites 234 that have test scenarios 244 and test scripts 254. E2E testing framework 205 provides E2E testing of application flow from start to end to simulate user scenarios and verify the system under test and its components. E2E testing framework 205 has the ability to interact through both the user interface 288 of AUT 294 and as well as API tests 274 directly to microservices 284, depending on use cases. That is, AppServer 142 can be configured to conduct UI mode testing and API mode testing. One difference between providing test input in UI mode and in API mode is that UI mode inputs utilize a GUI with HTML representation, and API mode test inputs are in a different representative format such as JSON. A test data template mapper, data mapping module 264, provides corresponding representation for these two different input formats (HTML and JSON). Hence, the scenario writer need not create two different input versions of directives in the test script.

E2E testing framework 205 utilizes search, logging and analytics engine 238 that provides centralized logging and tools for searching, analyzing and visualizing logged test data in real time. Search, logging and analytics engine 238 utilizes Elasticsearch, Logstash, and Kibana, also referred to as the ELK stack, in one implementation. Elasticsearch is a search and analytics engine. Logstash is a server-side data processing pipeline that ingests data from multiple sources simultaneously, transforms it, and then sends it to a stash such as Elasticsearch. Kibana enables users to visualize data with charts and graphs in Elasticsearch. ELK stack enables users to search, analyze, and visualize test data in real time, and provides centralized logging usable for identifying problems with servers, applications and networks; in one example, ELK enables testers to search the full set of logs in a single place. Search, logging and analytics engine 238 logs from wherever the automated testing is run. Search, logging and analytics engine 238 can be implemented using Splunk or another set of log, search and analytics tools in a different implementation.

Further continuing the description of FIG. 2, E2E testing framework 205 also contains resource setup engine 236 with automation utilities 246 that execute common commands, such as for test setup, for the test user logging in and authenticating before running the tests and for setting up the hardware under test to be used by test scripts 254. Test suites 234 include test scenarios 244 expressed in steps, also referred to as test scripts 254. The scenarios define customer tests in one use case, generic tests in another use case, proof of concept (POC) tests in a third use case, and internal tests in yet another case.

Figure 3:
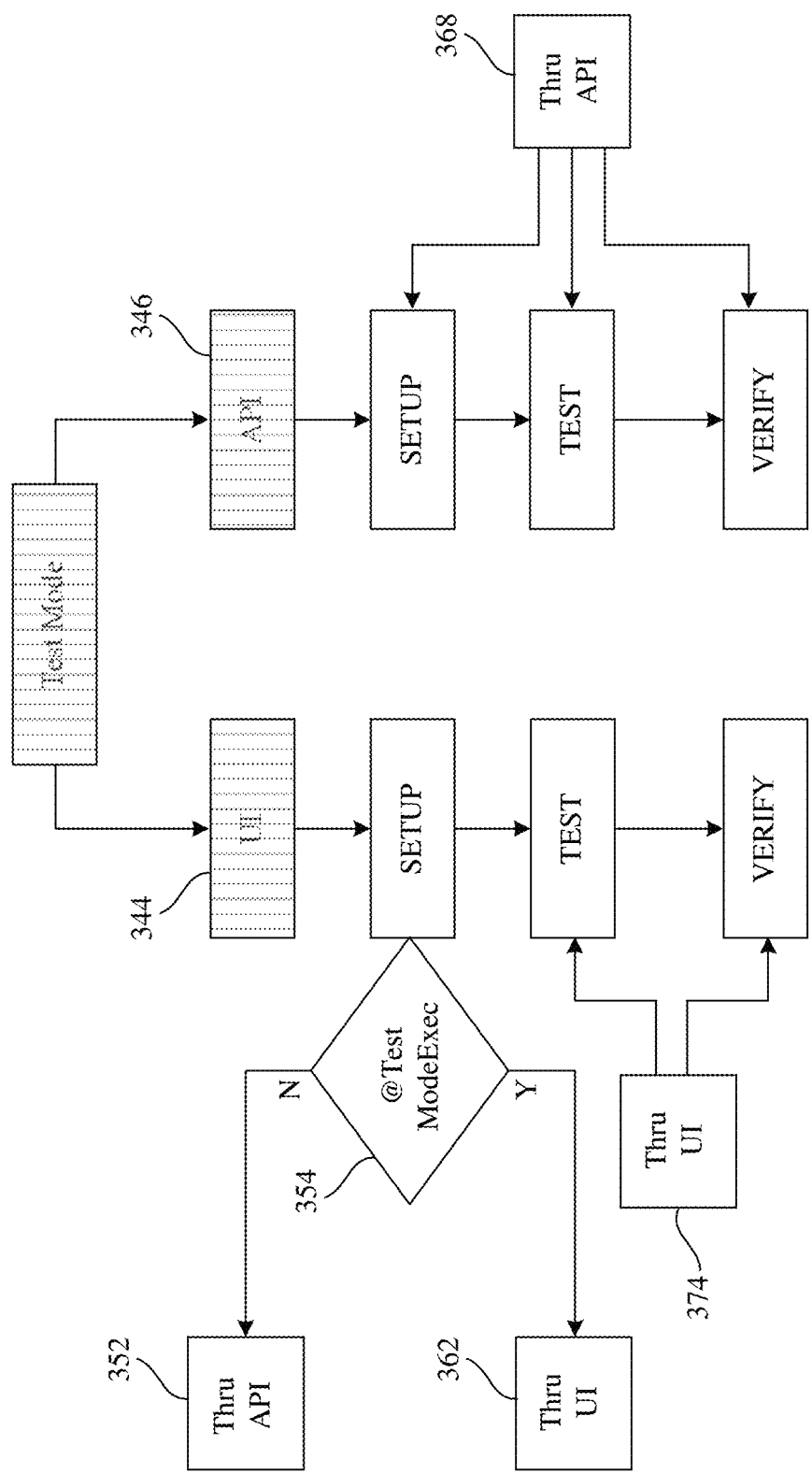
FIG. 3 illustrates the relationship between test modes for API mode and UI mode.

E2E testing framework 205 further contains disclosed test script parser 225 that handles override directives that modify a UI directive that specifies at least part of the setup test stage, when executing the test script, described further relative to FIG. 3 later. Test automation framework 205 uses test script processor 225 for test scripts 254. Test script interpreter 235 checks the test script to determine whether an associated resource has already been provisioned in a current test session, and upon encountering a second instance of requesting provisioning of the associated resource, can determine whether the associated resource was designated as being reusable. Test script processor 225 is implemented utilizing Gauge, a cross-platform test automation tool with modular architecture, that uses markdown to author test cases and scenarios in plain English format with markdown script. Scenarios in Gauge have individual steps that the automation follows. In a different implementation, a different test automation tool can be used for authoring test scenarios.

E2E testing framework 205 also has resource location navigator 255, custom exception handler 256, error annotation memory 257, data mapping module 264, test parameter data structure 266 and parameter UI and reporting 267 with display generator 278 that formats and supports display of test data, errors and problem resolution hints. Resource location navigator 255 locates resources that have been renamed or whose path has been altered, via resource locators keyed to resource names and to resource positions in a parsed data structure.

Further describing architecture 200, E2E testing framework 205 contains custom exception handler 256 for customized and categorical error handling during a test. Following one or more tests, custom exception handler 256 parses an error log and causes display to a user of one or more errors including error codes, and receives from the user, for at least some of the errors, a respective error source category and/or problem resolution hint. Custom exception handler 256 stores an error code and the respective error source category and/or problem resolution hint, received from the user, as an annotation in error annotation memory 257. Upon receiving a subsequent error including a subsequent error code, custom exception handler 256 correlates a subsequent error code with the error source category and/or problem resolution hint available from error annotation memory 257 and enhances a message accompanying the subsequent error and causes display of the enhanced message.

Architecture 200 also includes data mapping module 264 for mapping of the fields in the display mark-up for a test user to the elements in test parameter data structure 266, based on names of the elements, also referred to as resources. Test parameter data structure 266 stores configurable values of elements.

The disclosed platform enables reusability of input test data for UI and API tests. In one case, API test data is usable for UI tests. The platform makes a UI available during a test, tied to configurable values of an underlying test parameter data structure with a pre-defined architecture. Tests can be operated in an application programming interface (API) mode and alternatively in a UI mode. The test parameter data structure is used to control the test in both the API mode and in the UI mode. The disclosed data mapping module 264 completes a mapping of the fields in the display mark-up to the elements in the test parameter data structure, based on names of the elements.

Portable E2E testing framework 205 is implemented in containers that can run on any computer that has network access to the application under test (AUT). The disclosed technology builds in layers, using Linux and Docker to host multiple test runner configurations in Docker containers. E2E testing framework 205 is configured to launch virtual test agents (VTAs) that emulate network functions for the application under test. In one implementation, E2E testing framework 205 runs a Linux environment with a Docker host that allows it to store VTA images, create containers from stored images, and launch the VTA containers. In other implementations, E2E testing framework 205 may run MICROSOFT® Windows or APPLE® Macintosh environments, either with Docker hosts, leveraging OS independent frameworks and running without the need to change test configuration variables across platforms. Alternative hosts on Linux environments may run multiple isolated Linux container engines. In addition, portable E2E testing framework 205 could be hosted on a virtual machine(VM) instead of a Docker container engine. While this disclosure refers to Linux and Docker, this successful lightweight container model is expected to spawn competing implementations. The technology can be implemented using containers or virtual machines FIG. 3 illustrates the relationship between test modes for API mode 346 and UI mode 344. For API mode 346, setup, test and verify are completed through the API 368 by default. The disclosed automation environment forces steps used for test setup to use the API, regardless of the parameter. This enforces best practices for replicability of test component configuration, which can make the test script more reliable and significantly faster. In contrast, for UI mode 344 tests, setup is through API mode 352, and test and verify are completed through the UI 374, because data appears in specific ways when testing and verifying the UI. For a third disclosed case in which the setup for UI testing needs to be completed in UI mode, an override directive associated with a UI directive is used to signal that setup will occur through UI 362.

The disclosed test framework, when testing the UI mode of the AUT, defaults to ignoring the UI mode during setup and to supplying setup values stored in a file directly to an API without rendering or interacting with UI elements in the setup section of the test script. Upon encountering an override directive in the setup section of the test script, which mandates interaction with a specified UI element in the setup section, and responsive to the override directive, test script parser 225 overrides the default of ignoring the specified UI element in the setup section, rendering the specified UI element, and applies a bot to programmatically interact with and supply setup values from the file to the specified UI element. The disclosed technology solves the problem of running a same test script in either UI mode or API mode even though the way data is entered for those tests is very different.

Tests operate in one of three modes: application programming interface (API) mode, UI mode that tests a UI using at least some of the configurable values of elements in the test parameter data structure, and an executive override mode that forces the test script parser to apply the UI mode to setup parameters, overriding its logic to ignore the user configuration. For the first case, configuration is set to API mode and the test script runs entirely in API Mode as coded and no changes are made to it. In this case, test script parser 225 favors use of unmodified test parameters in test parameter data structure 266, enforcing this by ignoring, for the setup portion of a test, a user configuration to select a UI mode 344, ignoring the user configuration for some or all of the test parameters. This improves repeatability but requires editing of the test script to adapt test parameters to special circumstances. For the second case, configuration is set to UI mode 344 and the framework will automatically take the setup steps and run them using the API 352 as per the best practices, preventing design mistakes. The test designer and coder (they could be two different people) do not have to do anything; the framework does this for them. For the third case, to be able to check the state of the UI during setup and compare it during the results phase, the test designer does not want the setup to be done via API because that would be comparing apples and oranges, so the coder has the option of using a @TestModeExec override directive that signals that a setup step must execute as configured and not be overridden. The @TestModeExec override directive or its equivalent can be applied to some or all of the setup section of the test script to force the script processor to apply the UI mode to even setup parameters, overriding its logic to ignore the user configuration.

Figure 7:
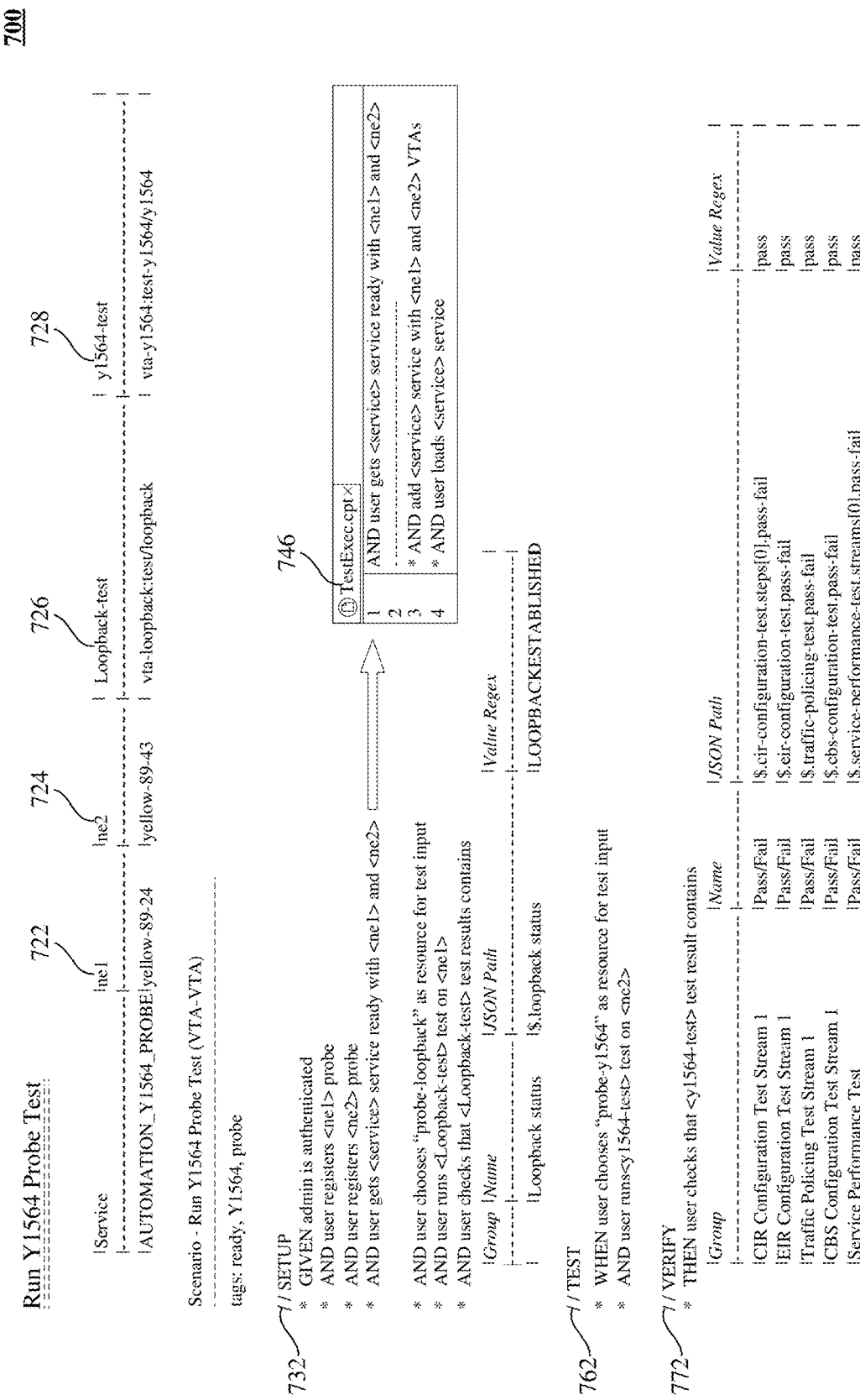
FIG. 7 displays the run scenario for a Y1564 probe test.

A business use case for a test through multiple execution modes will have many common execution steps typically. A scenario which represents the business use case can be developed to cover both UI and API steps. The disclosed framework offers an execution approach of the same scenario via both UI and API. In one example, the override directive described earlier can be utilized to add a service with the virtual test agents (VTAs) and load. After the UI step for adding a service with the VTAs, the remaining scenario steps can be the same for both the use case through the UI and the use case through API mode. FIG. 7 illustrates an example scenario for running a Y1564 probe test, as described later in this document.

Figure 4A:
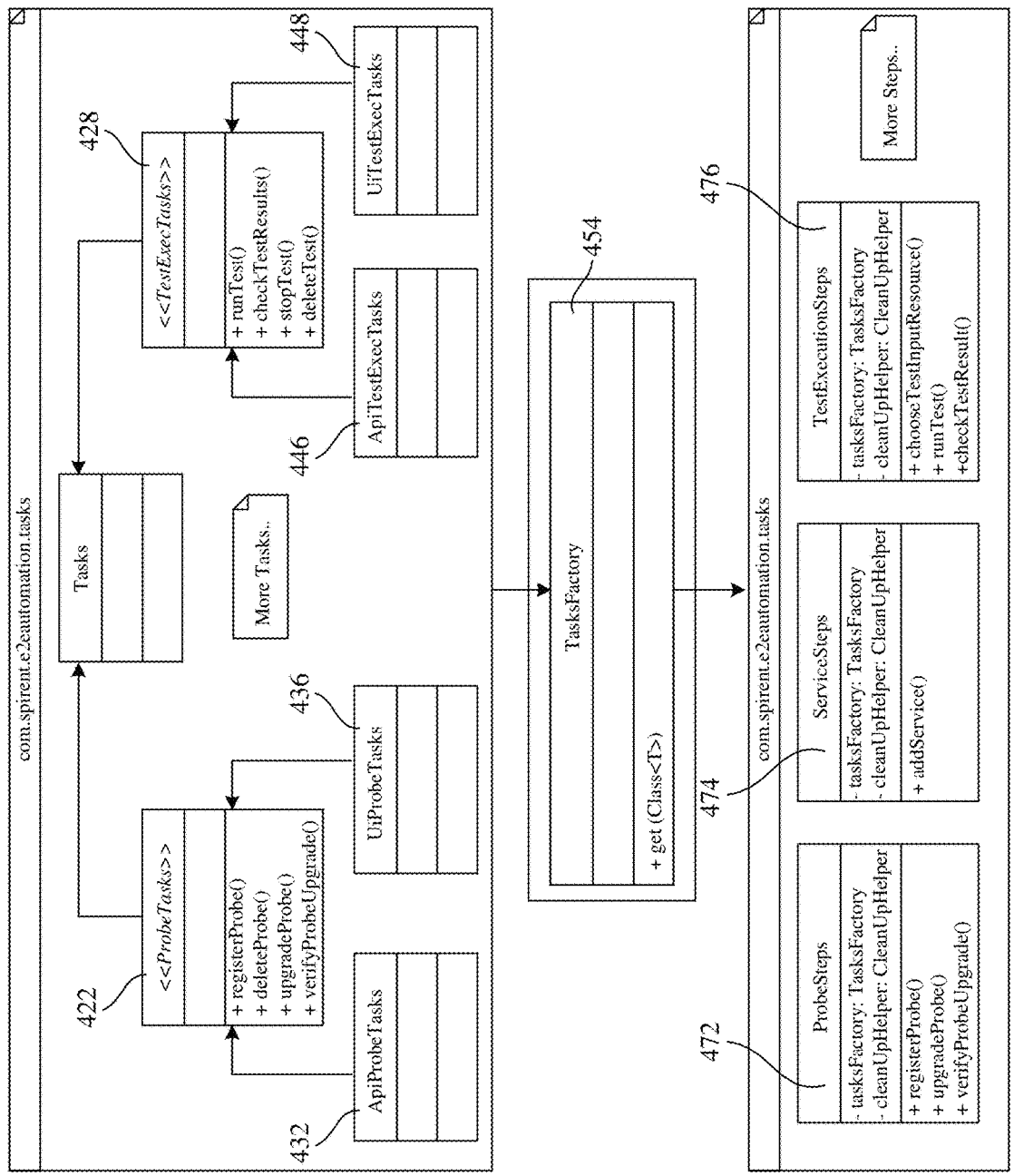
FIG. 4A displays a high level task and step structure for the disclosed end-to-end test automation platform.

FIG. 4A displays a high level task and step structure for end-to-end test automation 400, with tasks and steps for completing tests using virtual service assurance (VSA) E2E testing framework 205. Automation tasks include probe tasks 422 with API probe tasks 432 and UI probe tasks 436. Test exec tasks 428 include API test exec tasks 446 for setting up, testing and verifying in API mode and UI test exec tasks 448 for setting up, testing and verifying in UI mode. Tasks factory 454 gathers applicable steps for completing the automation tasks.

Continuing the description of FIG. 4A, step definitions in test framework 205 contain the actions to setup, test and verify, completing the step in API mode and in UI mode. A test suite includes a set of one or more test scenarios, also referred to as test scripts, and test scenarios include a set of steps. Repeated steps are grouped into a single step, also referred to as a concept. Concepts make maintenance easier since changes only happen in one location. Steps for automating the test include probe steps 472 of registering, upgrading and verifying the probe upgrade, for example. Service steps 474 add a service and "clean up", releasing resources no longer required after the test is complete. Test execution steps 476 for choosing test input resources, running the test and checking the test results are also included. More steps, not listed in FIG. 4A, perform additional tasks during test automation.

The disclosed E2E testing framework 205 delivers flexible configuration options for use of parameters: (a) on the command line via test parameter UI and reporting 267, (b) from an external configuration file 242, (c) from the configuration file 245 included in E2E testing framework 205 or (d) from any combination of (a), (b) and (c). External configuration files 242 are configuration files for external systems 104 that can be defined by people outside the automation team, such as a lab engineer. The automation uses those files to generate the necessary commands to communicate with the hardware for the test scripts.

Figure 4B:
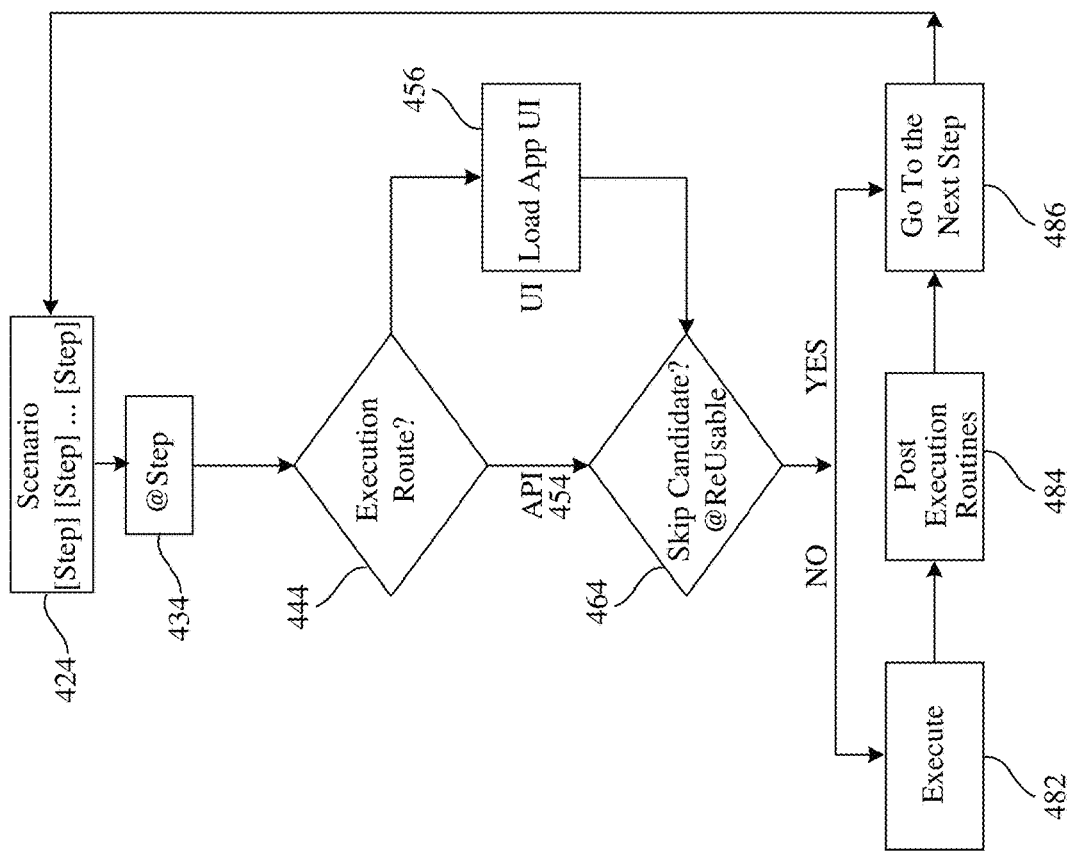
FIG. 4B shows test flow for a scenario with multiple steps and illustrates the reusable-resource-tag functionality.

FIG. 4B shows test flow for a scenario with multiple steps and illustrates the reusable-resource-tag functionality. The step definitions 424 in the framework contain the actions for completing the scenario via UI mode 456 and via API mode 454. A run time parameter determines the execution route; that is, whether the step runs against API or UI. A single scenario is used for verifying that the API mode works the same way as the UI mode. From API 454 and from UI 456, a step is checked to learn whether it is a candidate for skipping 464 by checking the status of a reusable-resource tag. If the step is not a candidate for being reusable—aka skipping, then the configuration step is executed 482, and post execution routines 484 are completed. One post execution routine sets a reusable-resource-tag so that a future encounter with a step that uses the same resource, if marked reusable, will be set for use. That is, upon first time use of the step tagged reusable, the data store gets updated, and the next steps benefit from the updated reusable flag. For the case in which the reusable-resource-tag signals that the configuration step can be skipped, the process goes to the next step 486. The reusable resource tag is illustrated in detail later. A code snippet example for executing the functionality of reusable steps is listed next.

@Around("(stepCandidates( ))")
Private void prepareStep(ProceedingJoinPoint pjp) throws Throwable {
  if (!scenarioHelper.shouldReUse( )) {
    //if not reusable yet due to previous failure, and still could be a candidate
    reUsableCandidate=isAnnotationApplied(pjp, ReUsable.class);
  execStep(pjp);
}
@AfterReturning("stepCandidates( )")
Private void AfterReturning( ) {
If (reUsableCandidate) {
  scenarioHelper.markAsReUsable( );
}
}

Figure 5:
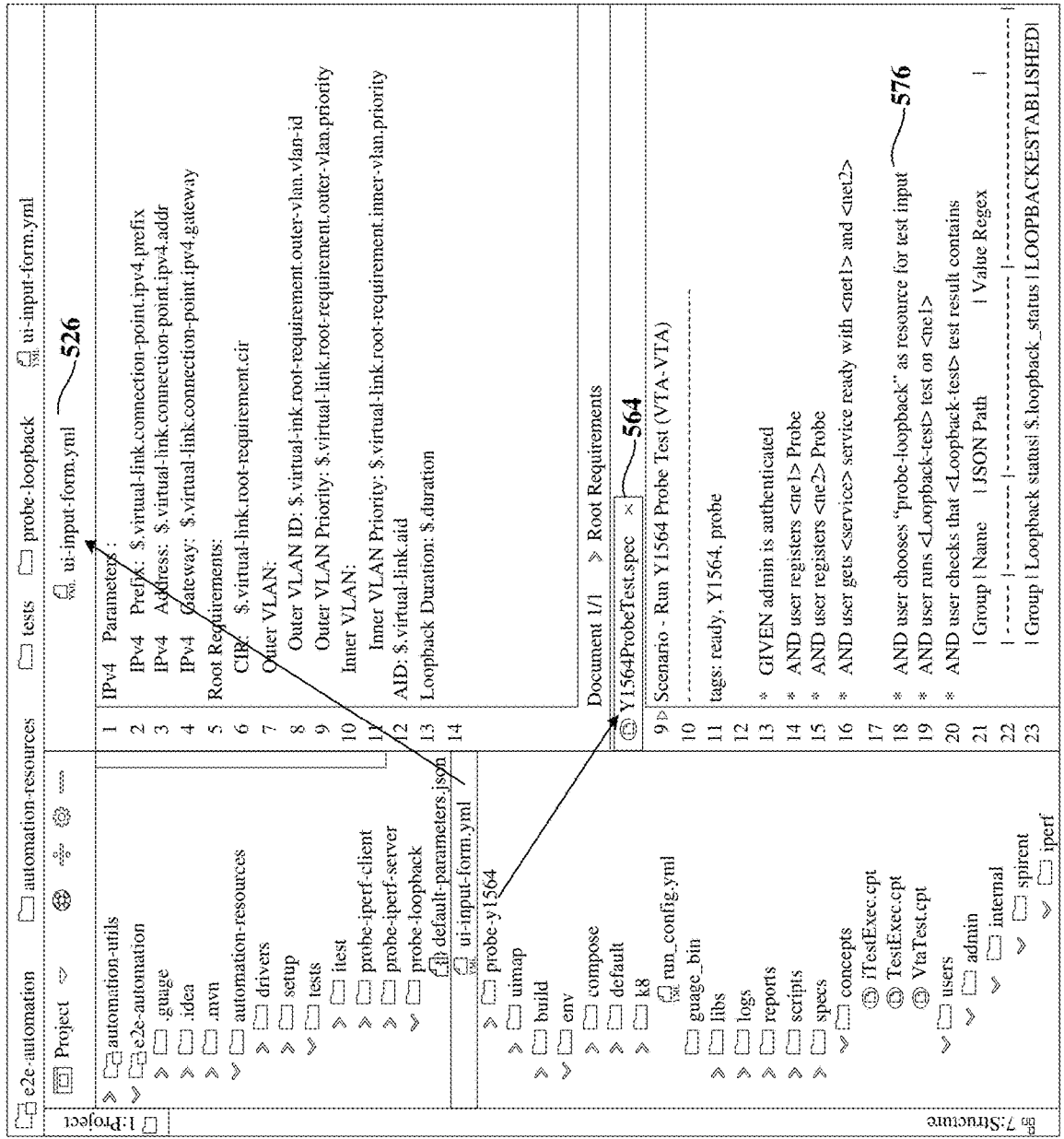
FIG. 5 and FIG. 6 together illustrate an example end-to-end test automation interface, with folders of resources, whose files can be selected for examination by a test user.
Figure 6:
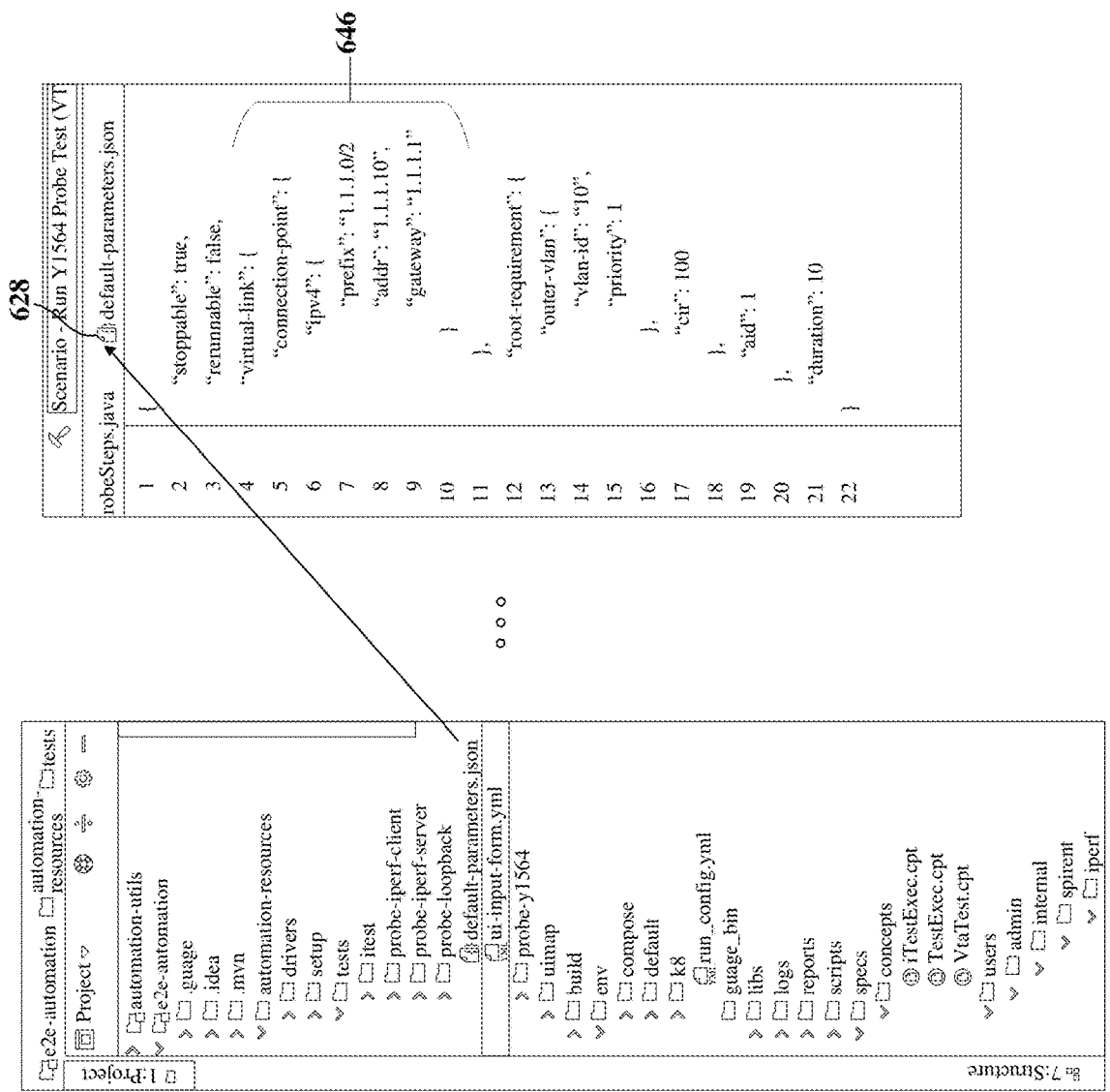

FIG. 5 and FIG. 6 together illustrate an example end-to-end test automation platform interface, with folders of resources, whose files can be selected for examination by a test designer. In FIG. 5, for the probe-loopback test, as an example, the UI input form 526 is selected for display in the upper center area of the test interface screen, in YAML. Y1564 testing measures Quality of Service (QoS) and network performance using ITU-T Ethernet-based service test methodology, including for troubleshooting of Ethernet-based services with the goal of assuring and verifying committed service level agreement (SLA) performances. A snippet of the Y1564ProbeTest.spec 564 that shows the scenario for running a Y1564 probe test is listed in the lower center area of the interface screen. The test can be run 576 using the default parameters in the JSON file 628 for "probe-loopback", listed in FIG. 6, so the test data is automatically set up.

FIG. 6 shows a left column of the platform interface with automation-resources, including tests and far right elements. In this example, the default parameters file for the Y1564 probe test, in JSON, is displayed in the far upper right quadrant of the test interface screen. The default parameters file 628, in JSON, for the selected probe loopback test includes the virtual link connection point 646, as listed in lines four through ten of the configuration file.

FIG. 7 displays the "run" scenario for a Y1564 probe test 700 (FIG. 5 shows a snippet of Y1564ProbeTest.spec 564 also). The probe test is utilized for different use cases for distinct users. For example, the Y1564 probe test can be run (a) for an internal proof of concept (POC) for test developers, (b) as an internal test for a network development team, or (c) at a customer structure for performance testing. Network elements ne1 722 and ne2 724 are configured for loopback test 726 for Y1564 test 728. Setup 732 utilizes the "given" keyword for registering the probes as network elements. TestExec.cpt 746 illustrates the grouping of repeated steps into a single step, referred to as a concept, to ease management of changes. Test 762 starts with the use of the "when" keyword, and verify 772 is triggered using the "then" keyword for checking the test results.

A suite of tests includes a set of scenarios, each of which includes steps, as described herein, for the end-to-end test automation. FIG. 8A and FIG. 8B show two snippets of scenario helper file 812A, 812B in Java. FIG. 8A show before suite 862 with case switches for setup via the "given" keyword 822, test via the "when" keyword 832, and verify triggered via the "then" keyword 842, in addition to exception handling 852. FIG. 8B shows a later snippet of the scenario helper file 812B, with after step 856, after scenario 866 and after suite 876.

FIG. 9 shows an example of "reusable" functionality for authenticating a test administrator, with a snippet of authentication steps 922, listing lines 11 through 31 in Java, for the automation interface. "Reusable" functionality is controlled by reusable resource tag 942, which supports just-in-time provisioning of test components, instead of over-initialization at the beginning of the test scenario, enabling some tests to begin earlier and reducing the provisioning required for relatively modest test scenarios. The reusable statement can be implemented as a declaration, such as a variable declaration done on a procedure that implements a step. Or, it can be applied in a script to a statement that provisions the test resource. Reusing a function whose role is authenticating a test administrator is an example for saving time and resources; the authentication script is repeated for many tests, since test users need to authenticate, in general.

FIG. 10 depicts a second example of "reusable" functionality, listing a snippet of the probe steps 1012 code for registering the probe and specifying the cleanup helper, showing lines 12 through 32 in Java. The "reusable" declaration 1042 is applied to a procedure that implements a step, equivalent to a statement in the test script that provisions the test resource. The implementation of a step is code while the actual step is a declarative sentence that appears in the test script, such as 'AND user registers <ne1> probe' 1062. In the example, during setup and test and verification stages, the probe is registered and the probe is released during cleanup, after the suite of tests has run. In a first section with authentication steps, test script processor 135 encounters a reusable-resource-tag and a first instance of requesting provisioning of an associated resource, and provisioning of the associated resource and keeping track of it as being reusable occur. In the second section, upon encountering a second instance of requesting provisioning of the associated resource, the disclosed technology determines that the associated resource has been designated as being reusable, and reuses the already provisioned instance of the associated resource instead of provisioning a new instance and instead of destroying the first instance and re-provisioning the associated resource.

Disclosed E2E testing framework 205 is an operating system independent framework that supports running tests across platforms without needing to change configuration variables. Test designers and coders select the types of tests for a specific customer with a critical issue.

FIG. 11 lists operational settings with example configuration variables that specify the resources for test scenarios for an application under test in a run configuration file, in yet another markup language (YAML). Controller info 1112 lists configuration specifics for a test run. Details include enabling secure socket layer (SSL) for an enabled single sign on (SSO) for a specific IP address, username and password. Test runner info 1114 specifies configuration in UI mode, for the Chrome browser with Selenium WebDriver timeouts configured, for UI automation use. Test resource information 1118 for the virtual testing platform (VTP) configures a specific client serial number and IP address and a specific server. The example run configuration of FIG. 11 lists the set up for a kernel-based virtual machine 1158 Juniper with specific client address and server address; Dell with specific client address and server address, and HP for a specific client and server (IP addresses not explicitly listed in FIG. 11). Virtual test agent specific resource 1178 configures an IETF Two-Way Active Measurement Protocol (TWAMP) test that measures round-trip network performance between two devices that support the TWAMP protocols, in this case a Y1564 service verification and performance test for the DNS server specified by a specific IP address (values not listed in the example). JSON could be utilized for configuration files, instead of YAML, in another implementation.

The disclosed testing framework 205 includes testing with test parameters 266, applied to AUT 294 that operates in both an API mode and a UI mode, as described earlier. For processing test scripts 254 that are configurable to test AUT 294 in the API mode and also in the UI mode, the UI mode renders and interacts with UI elements utilizing test values stored in elements of data structure test parameters 266, used by the test script for both API tests 274 and UI tests 276. Display generator 278 provides display mark-up in test scripts 254 that are rendered in the UI mode and that format fields in a display or parts of the display to receive data that map to specific elements in test parameters 266, but which display mark-up leaves to be completed a mapping connection between the fields in the display and the specific elements in the test parameter data structure. Data mapping module 264 provides a data mapping that maps the fields in the display mark-up to the elements in test parameters 266, based on names of the elements. While processing a test script in UI mode, display generator 278 renders the display mark-up from the test script. A bot programmatically interacts with and completes the display mark-up. Data mapping module 264 applies the data mapping to identify the elements in test parameters 266 to be used to complete the fields in the display mark-up and causes processing of the completed fields in the display mark-up. Fields in the display mark-up include labels and the data mapping maps the labels to fully qualified names of the elements. Reusable display mark-up in modules can be included in instances of UI elements, and the display mark-up is reusable for future tests.

It is easy for small, seeming local corrections in one place in a set of test scenarios to break test scripts, unintentionally, as systems undergo continuous refinement. Small details change frequently, such as correction of typographical errors in user interface components and in data structure names, as described earlier, as well as continuous development resulting in HTML elements getting updated and rearranged frequently.

The technology disclosed solves the problem of resource renaming and divergence between data structures and user labels, supporting specification and invocation of alternate and failover resource locators. Multiple different locators for the same HTML element are allowed. XPath is used to find the location of any element on a webpage using HTML DOM structure. The locator is a way to find the element in an HTML page DOM structure after changes to the element whose name gets updated or rearranged, via the element's XPath, ID, name, CSS selector, link-text, tag-name, or other identifier.

The disclosed automation utilizes the defined locators before declaring that an HTML element cannot be found. This makes it possible for automation scenarios to continue running even after minor changes are made to a web page. Elements are also referred to as resources.

Name and position-based locators are supported, keyed to resource names and to resource positions in a parsed data structure. When an attempt to locate a resource using a fully qualified resource name fails, the disclosed technology automatically invokes an alternate resource locator. One style of alternate resource locator that operates by position is an XPath expression. This navigation syntax can be applied to JSON, XML or other hierarchical, parsable data structures. Multiple locator expressions can be successively specified. The first locator expression in a group that succeeds is used. An error results only when none of the available locator expressions succeed.

A central repository for resource locators in the disclosed end-to-end automation platform stores sets of named alternative locator expressions for a resource that include first resource locators keyed to resource names on user interfaces and second resource locators keyed to resource positions on user interfaces. The central repository is not part of the compiled code. Instead resource locators are keyed to resource names and to resource positions in a parsed data structure, on user interfaces in the disclosed test environment. The repository contents are readily changeable without recompiling the tests. The XPath for a resource can be edited in the UI.

The applicant's Visionworks product, also referred to as VSA, uses active test agents and synthetic traffic to automate turn-up, monitoring and troubleshooting for 5G, LTE, Ethernet, SD-WAN, Cloud networks. VSA locator examples are described next.

Figure 12A:
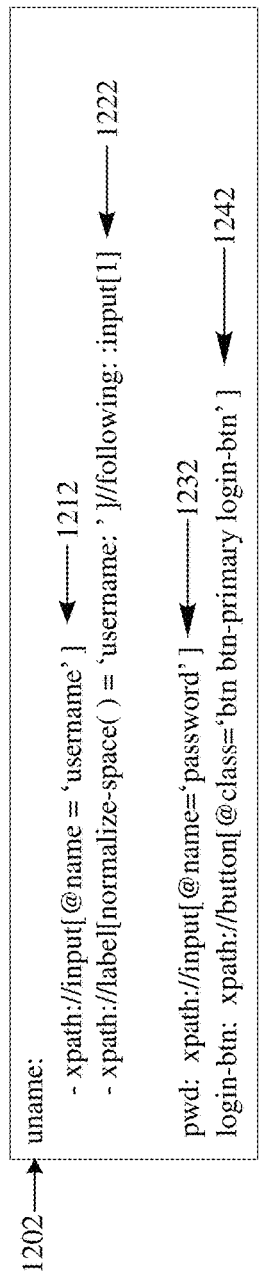
FIG. 12A shows two resource locator candidates for the "uname" field element.

FIG. 12A shows two resource locator candidates for the "uname" field element. The first resource locator candidate 1212, is relative XPath, and that first XPath is relying on the @name tag to be 'username'. The second, failover resource locator candidate 1222 is relative neighbor-based XPath 1122 for the username text field element "uname" 1202.

//input[@name='username']

l/label[normalize-space( )='Username:']//following::input[1]

If the first resource locator candidate does not successfully locate the element, then disclosed resource location navigator 255 tries the next locator candidate, automatically using the second resource locator keyed to the resource position after failure of locating the resource using the resource name. Some elements have single locators, which is also supported by the disclosed framework. FIG. 12A shows a single locator candidate for password 1232 and a single locator candidate for a login button 1242.

Figure 12B:
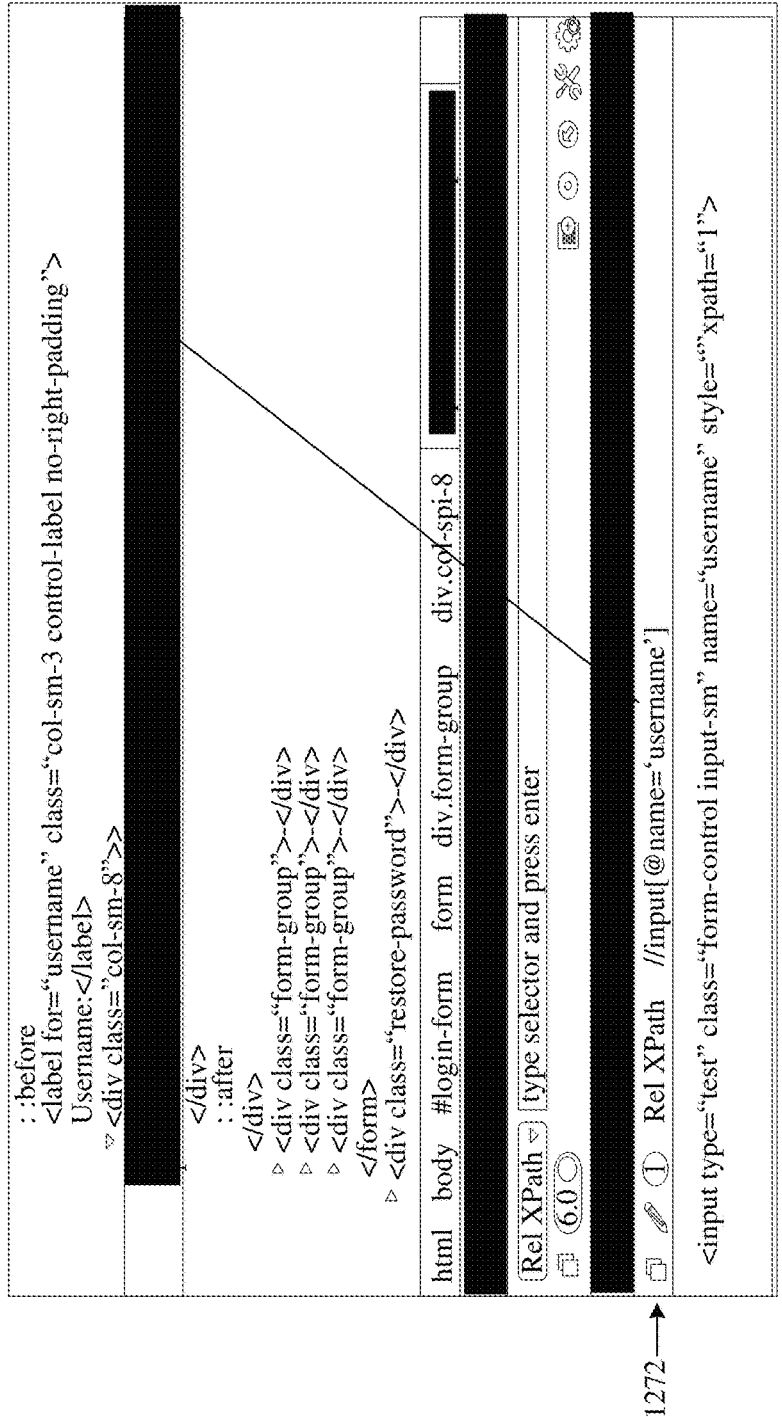
FIG. 12B shows an example of resolving the relative XPath for the user name in the scenario in which a developer changed the username field element to "username", from "uname".

FIG. 12B shows an example of resolving the relative XPath 1272 for the user name in the scenario in which a code developer changed the username field element to "username", from "uname" 1202. Because of that change, the first locator fails. Then, the element can still be found and the test can continue using the second neighbor based locator which relies on the label to be "username", generating the relative XPath selector 1272 for the selected node.

Figure 12C:
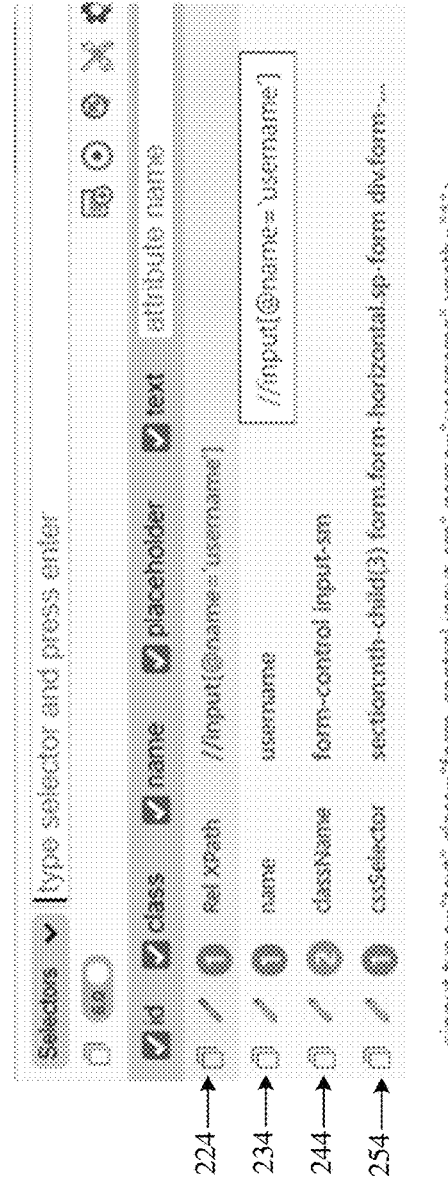
FIG. 12C shows resource-related fields: relative XPath, name, class Name and CSS selector, each of which is editable via the UI, instead of being hardcoded, so that the code need not be recompiled to make minor changes.

FIG. 12C shows resource-related fields: relative XPath 1224, name 1234, className 1244 and CSS selector 1254, each of which is editable via the UI, instead of being hardcoded, so that the code need not be recompiled to make minor changes. Instead the disclosed resource locators are usable to find the "missing" resources that have been changed by designers, over time.

Figure 12D:
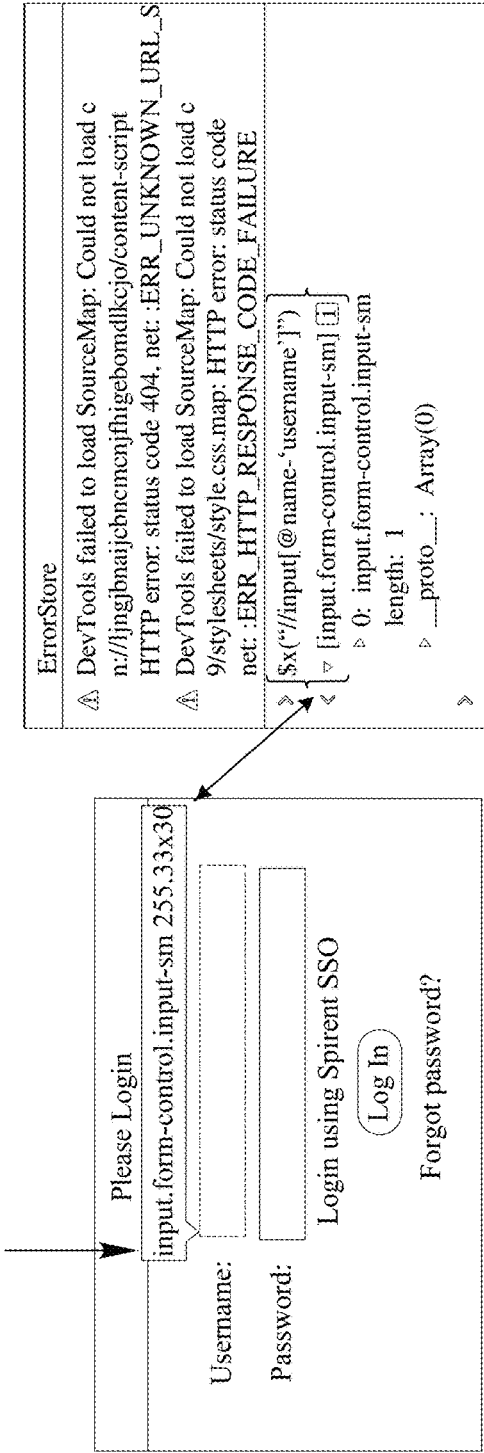
FIG. 12D shows the resolution of the locator candidate using the neighbor locator for the username field.

FIG. 12D shows the resolution of the locator candidate using the neighbor locator 1256 for the username field. Resource locator candidates can be applied for many elements on a webpage using HTML DOM structure, such as for passwords and model numbers for testers.

FIG. 12E shows an example XPath usable to locate a right menu branch item based on the name of the menu item in the UI, which is parameterized by '% s' 1226. In this example, the XPath for locating the selected TWAMP test, "vta-twamp:test-twamp-server/server", is highlighted in bold in FIG. 12E and listed next:

"//li[./span[text( )='vta-twamp:test-twamp-server/server'] and not(contains(@class, 'rerunnable'))]//span[text( )='vta-twamp:test-twamp-server/server']"

After selection of the TWAMP test via the menu on the right side of the screen (not shown), the Run VTA Test popup dialog box depicted in FIG. 12G is presented for 'vta-twamp:test-twamp-server/server'. To locate a particular field by IPv4 address, disclosed resource location navigator 255 locates the corresponding test parameters block 1236. For IP address, two blocks have similar parameter names: IPv4 Parameters 1266 and IPv6 Parameters 1276. The resulting XPath:

".//div[@class='block-group']/span/a[contains (text( ),'IPv4 Parameters')]/../.."

To locate a particular input field from VTA Test pop up, the input values are passed from test parameters input 1246 from the test scenario so the test can be executed. Here '% s' denotes the label on the left of these input fields. For example, to locate IPv4 Address, the XPath would be as listed next, for IPv4 address:

test-parameters-input: xpath:.//div[not(contains(@class, 'hidden'))]/*[contains(text( ), 'IPv4 Address')]/../following-sibling::*/*[contains(@class, 'form-control') and not(contains(@class, 'invisible'))]

Disclosed resource location navigator 255 also handles test input parameters from additional kinds of fields in addition to text boxes, such as checkboxes and radio buttons. FIG. 12F shows an example of fields with checkbox input format for "Stream Template" 1262 and "Stream Info Template" 1282. The test parameters checkbox XPath is listed next:

test-parameters-checkbox:
    xpath:.//span/a[contains(text( ),'% s')]/../label[@rel='tooltip']

The XPath for locating the checkbox for "Stream Template" would be as listed next:

".//span/a[contains(text( ),'Stream Template')]/../label[@rel='tooltip']"

An example for locating the test confirm button is listed in FIG. 12E, for confirming the test input parameters are ready for proceeding with the test execution. The XPath does not change for the confirm button as no parameters are passed with it.

test-confirm-button: xpath://button[@data-event='confirm']

Figures 13A, 13B, 13C:
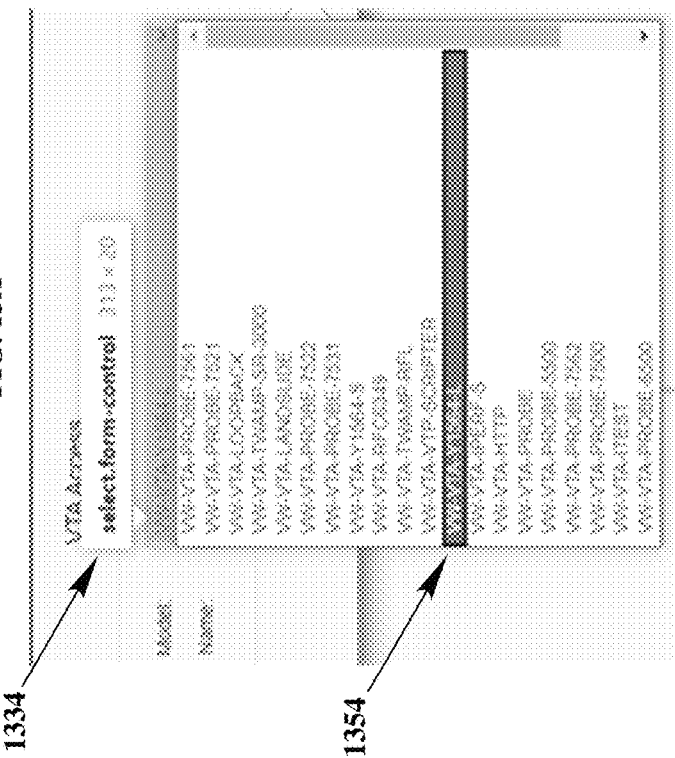
FIG. 13A lists the XPaths for the model number popup shown in FIG. 13B.
FIG. 13B shows an illustration of a model number popup.
FIG. 13C illustrates an example admin link element, which is one of the section titles from the left side of an example VTA Test UI, with two possible XPath locators.

Resource location navigator 255 also utilizes locators for dropdown input. FIG. 13A lists the XPaths for the model number popup shown in FIG. 13B. No parameters are passed via the XPath so it remains the same for the multiple scenarios.

model-no-ckt-popup: xpath://select[@name='models']

The XPath for locating the input field for the Name of the VTA device 1324 is listed next.

name-no-ckt-popup: xpath://input[@placeholder='Type to search a device']

FIG. 13C illustrates an example admin link element, which is one of the section titles from the left side of an example VTA Test UI, with two possible XPath locators—first is regular 1364 and the second is neighbor XPath 1374 for locating the T&D Microservices Admin on screen.

In HTML, T&D Microservices Admin is represented as listed next:

<a href="#td-ms/admin">T&D Microservices Admin</a>

In this example, #td-ms/admin is an href value, so the first XPath for locating the T&D Microservices Admin clickable section title from the left side of the UI is constructed based on that value:

xpath://a[@href='#td-ms/admin']

The element T&D Microservices Admin can be located using the neighbor locator instead of the regular one. That is, the same element can be located differently by finding the neighbor first. In this example, resource location navigator 255 would find the element with the "Performance Monitor" label first and then, as the XPath includes //following::a[1] 1378 at the end, would find the next <a> element which is T&D Microservices Admin.

These locator examples show ways that resource locators are keyed to resource names and to resource positions on user interfaces in the disclosed test environment. The repository contents are changeable without recompiling the tests and the XPath for a resource can be edited in the UI.

E2E testing framework 205 provides customized exception handling in support of post-test investigation. With custom resolution hints and known error types, the investigation of what went wrong with failed scenarios is more straightforward to resolve. Custom exception handler 256 categorizes scenario failures based on the exception type. Error annotation memory 257 serves to store user annotations of errors reported with intercepted exceptions. Following one or more tests, when custom exception handler 256 senses that an exception has been intercepted for a test in a suite, the display generator 278 presents current error information reported with the exception to the user—such as the source category and a problem resolution hint. Custom exception handler 256 receives from the user, for the current error, a current error source category and in some cases, a current problem resolution hint, and stores the current error source category and the current problem resolution hint, received from the user, in error annotation memory. Subsequently, upon sensing that an exception has been intercepted for a test in a suite, custom exception handler 256 delivers problem resolution hints responsive to the intercepted exception to the user, retrieved from the error annotation memory.

Figure 14:
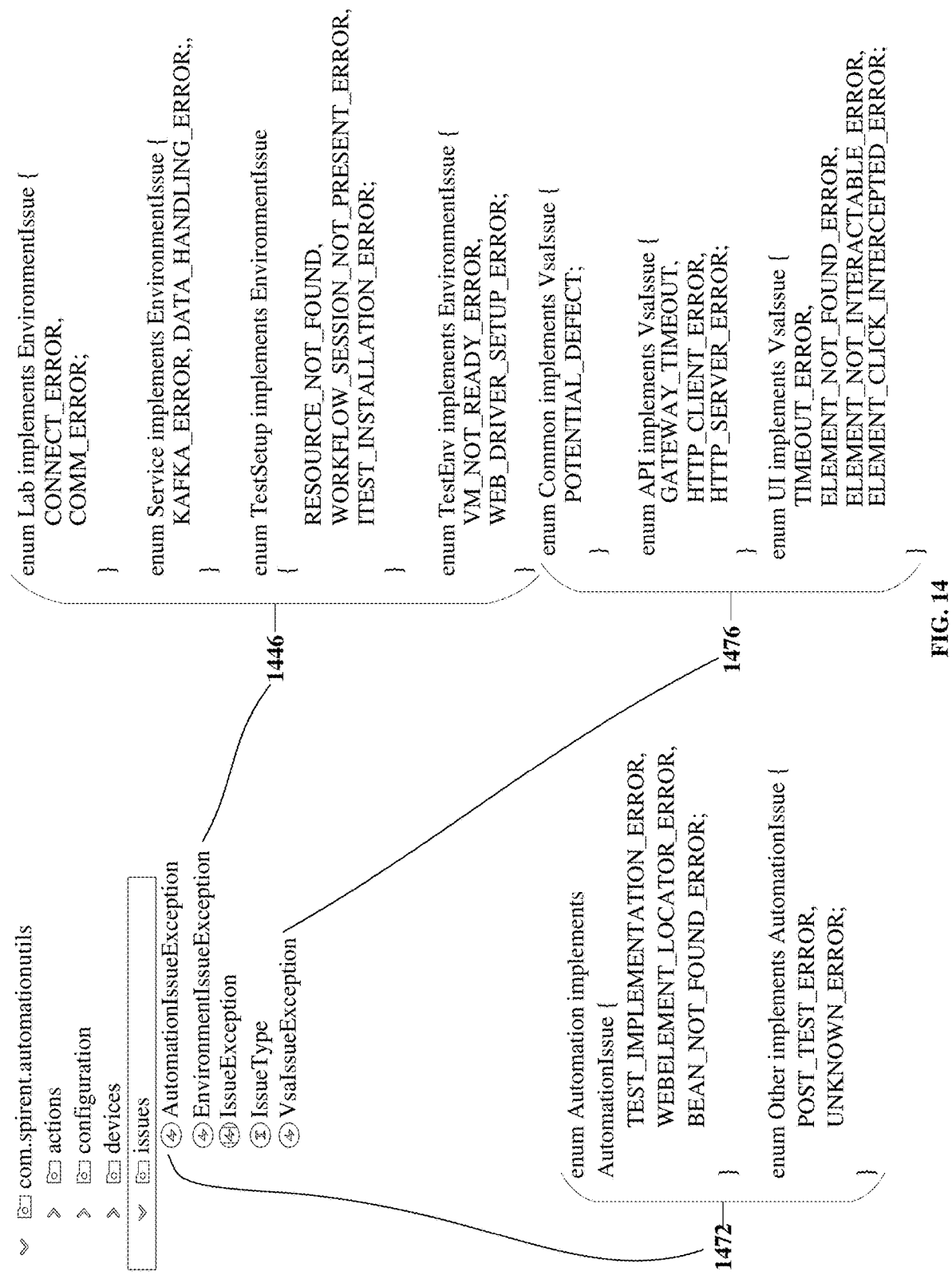
FIG. 14 displays multiple example categories of issues and lists errors associated with the issue categories.

FIG. 14 displays multiple example categories of issues and lists errors associated with the categories. The categories displayed are automation issues 1472, environment issues 1446 and VSA issues 1476. VSA issues 1476 represents potential problems with the product, including issues at the end of application under test's (AUT) side. environment issues 1446 are problems related to the testing environment and resources. For example, custom exception handler 256 identifies problems with the expected lab hardware, labelled as a network or device issue, or VM for which tests need to be run. Automation issues 1472 identify issues present in the test scenarios and framework, to separate the test implementation issues. For unforeseen problems that occurred, for which the framework does not know under which of the above three to categorize, the issue gets listed in an "other" category. After the investigation of the issue is done, exceptions categories and sub-categories get updated accordingly.

FIG. 15 lists code snippets for capturing errors for customized exception handling in the framework. For a register probe step in E2E testing framework 205, when an error registering the probe occurs, VSA Issue Exception records that the framework was unable to register the probe 1544, along with the probe name. In another example, for an empty model when resources are expected, an environment issue class of exception is recorded of "resource not found" 1574 with the resource path that was not found or does not contain a matching JSON or YAML file for the given model.

Custom exception handler 256 receives, from the user, resolution hints for the problems categorized as VSA issues 1476, environment issues 1446, automation issues 1472 and "other" issues. Display generator 278 formats at least parts of the display to present the error code with the error source category and displays the source category and the problem resolution hint, if available. Display generator 278 also support entry or updating or confirming of the source category and the problem resolution hint for the error reported with an intercepted exception. After the first time investigation with detailed error stack tracing used to understand what specifically went wrong and needs to be fixed after the test failed, each issue in the source categories gets updated with the resolution hint. As running tests and troubleshooting can be a continuous process, problem resolutions get updated as needed, based on the findings.

A user may enter, or custom exception handler 256 may have problem resolution hints stored, for various intercepted exceptions. The problem resolution hints for the intercepted exceptions can include DUT issues, test environment issues and test automation issues, as well as other issues. In one example, for a VSA unable to register probe issue 1544, relevant resolution hints can be informed based on the error-stack trace. The issue could be either a hardware/ network issue or may be the probe is not configured properly for the test environment. In the environment category, a resource not found exception 1574 would be some missing a test resource file or content, and the resolution hint would be to add the file or content back according to the standard testing resource guideline. The "other" category can be any of the source category types which need to be determined after investigation. Some resolution hints can be recommended based on the case-by-case error tracking approach as well.

Workflows

FIG. 16 shows a representative method of efficient testing by selective UI interaction, through test script sections including setup, execution and verification, applied to an application under test (AUT) that operates in both an application programming interface (API) mode and a user interface (UI) mode. Flowchart 1600 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 16. Multiple actions can be combined in some implementations.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of efficient testing by selective UI interaction 1615. The method of efficient testing also includes providing a test environment that, when testing the UI mode of the AUT, defaults to ignoring the UI mode during setup and to supplying setup values stored in a file directly to an API without rendering or interacting with UI elements in the setup section of the test script 1635. Further included is encountering an override directive in the setup section of the test script, which mandates interaction with a specified UI element in the setup section 1655, and responsive to the override directive, overriding of the default of ignoring the specified UI element in the setup section, rendering the specified UI element. The method also includes applying a bot to interact with and supply setup values from the file to the specified UI element 1675. Other embodiments of this aspect include corresponding computer systems, apparatus, and computer programs recorded on one or more computer storage devices, each configured to perform the actions of the methods.

Other implementations may perform the actions in different orders and/or with different, fewer or additional actions than those illustrated in FIG. 16. Multiple actions can be combined in some implementations. For convenience, this flowchart is described with reference to the system that carries out a method. The system is not necessarily part of the method.

Figure 17:
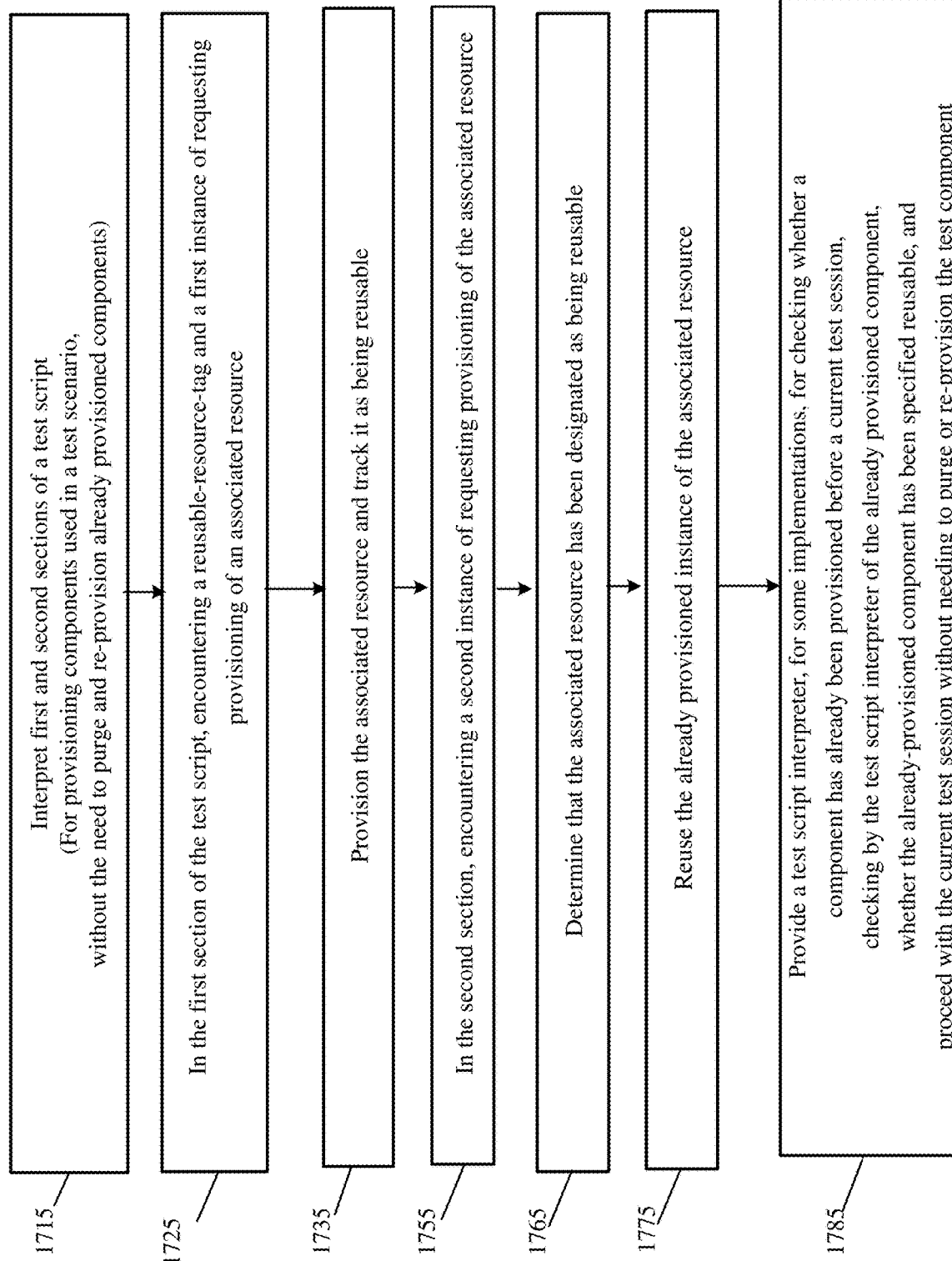
FIG. 17 shows a representative method of provisioning components used in a test scenario, without the need to purge and re-provision already provisioned components.

FIG. 17 shows a representative method of provisioning components used in a test scenario, without the need to purge and re-provision already provisioned components. Flowchart 1700 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 17. Multiple actions can be combined in some implementations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of provisioning components used in a test scenario. The method of provisioning components also includes interpreting first and second sections of a test script 1715. In the first section, the method includes encountering a reusable-resource-tag and a first instance of requesting provisioning of an associated resource 1725 and provisioning the associated resource and keeping track of it as being reusable 1735. The components also include in the second section, encountering a second instance of requesting provisioning of the associated resource 1755, determining that the associated resource has been designated as being reusable 1765, and reusing the already provisioned instance of the associated resource instead of provisioning a new instance and instead of destroying the first instance and re-provisioning the associated resource 1775. Extending the method includes providing a test script interpreter for checking whether a component has already been provisioned before a current test session, checking by the test script interpreter of the already provisioned component, whether the already-provisioned component has been specified reusable, and proceeding with the current test session without needing to purge or re-provision the test component. Other embodiments of this aspect include corresponding computer systems, apparatus, and computer programs recorded on one or more computer storage devices, each configured to perform the actions of the methods.

Figure 18:
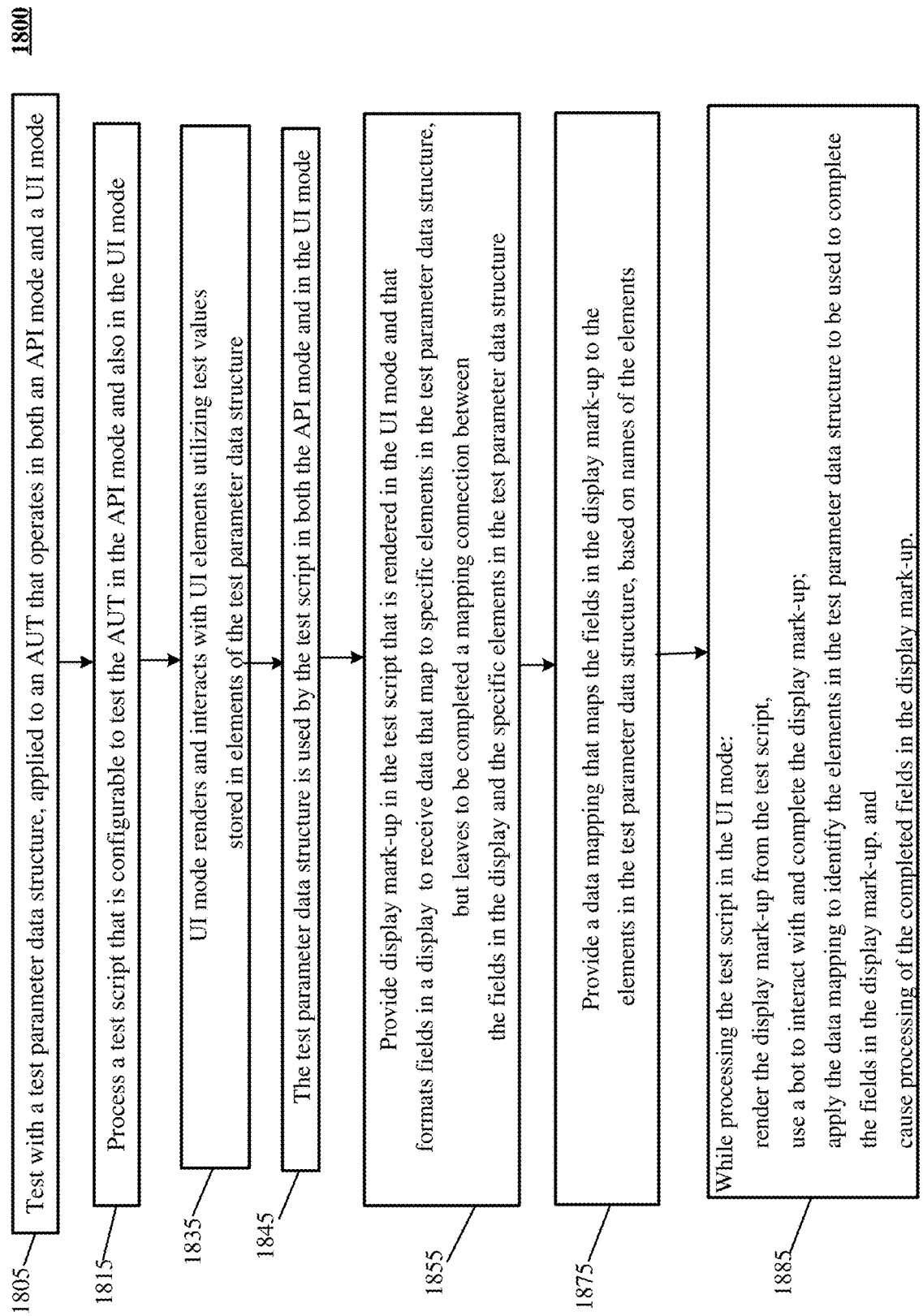
FIG. 18 shows a representative method of testing with a test parameter data structure, applied to an application under test (AUT) that operates in both an application programming interface (API) mode and a user interface (UI) mode.

FIG. 18 shows a representative method testing with a test parameter data structure, applied to an application under test (AUT) that operates in both an application programming interface (API) mode and a user interface (UI) mode. Flowchart 1800 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 18. Multiple actions can be combined in some implementations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of testing with a test parameter data structure 1805. The method of testing also includes processing a test script that is configurable to test the AUT in the API mode and also in the UI mode 1815, where the UI mode renders and interacts with UI elements utilizing test values stored in elements of the test parameter data structure 1835, and the test parameter data structure is used by the test script in both the API mode and in the UI mode 1845. The testing also includes providing display mark-up in the test script that is rendered in the UI mode and that formats fields in a display or parts of the display to receive data that map to specific elements in the test parameter data structure, but which display mark-up leaves to be completed a mapping connection between the fields in the display and the specific elements in the test parameter data structure 1855. The method also includes providing a data mapping that maps the fields in the display mark-up to the elements in the test parameter data structure, based on names of the elements 1875. Further included is, while processing the test script in the UI mode, rendering the display mark-up from the test script, using a bot to interact with and complete the display mark-up, applying the data mapping to identify the elements in the test parameter data structure to be used to complete the fields in the display mark-up, and causing processing of the completed fields in the display mark-up 1885. Other embodiments of this aspect include corresponding computer systems, apparatus, and computer programs recorded on one or more computer storage devices, each configured to perform the actions of the methods.

Figure 19:
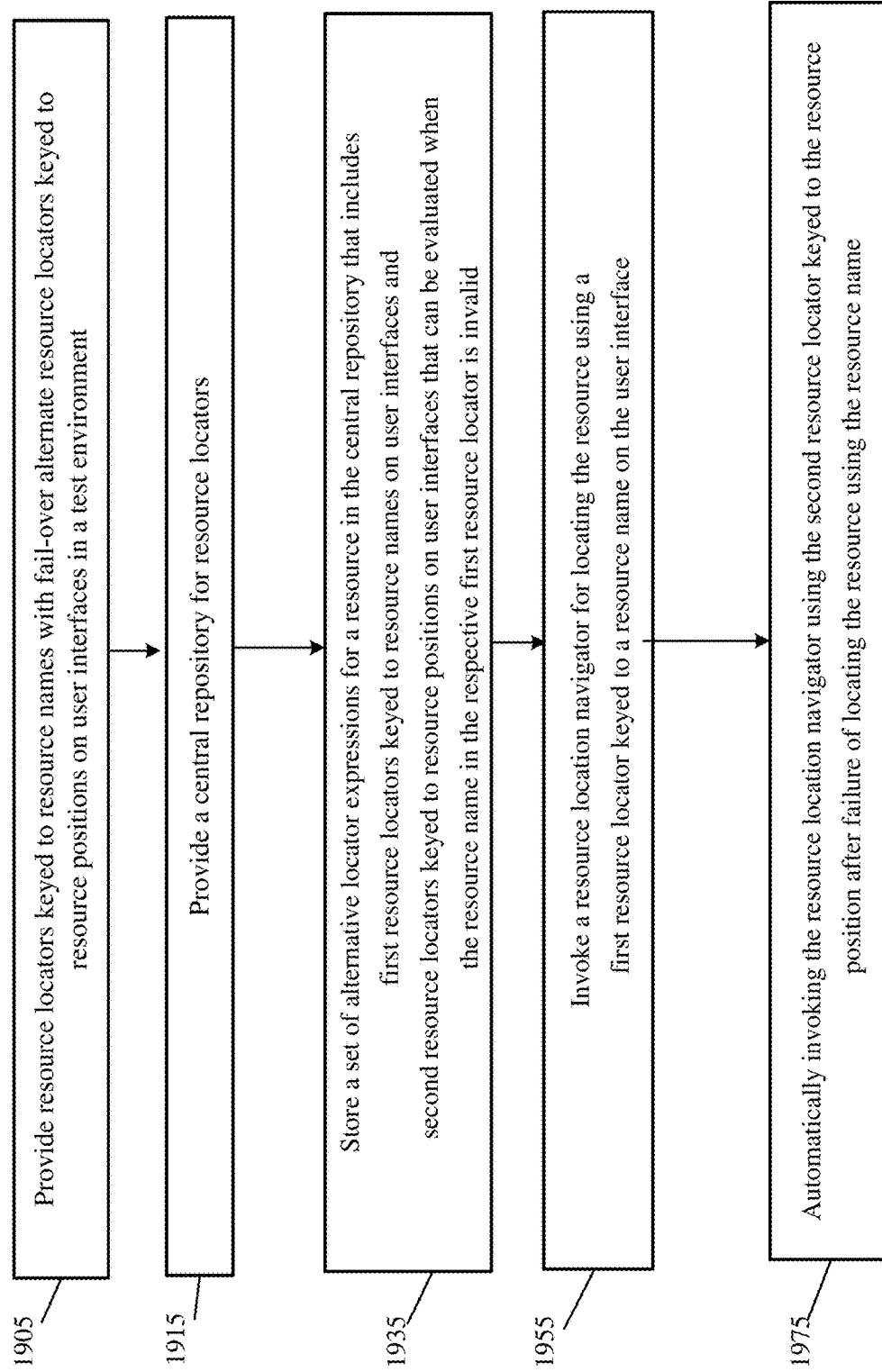
FIG. 19 shows a representative method of providing resource locators keyed to resource names and alternatively keyed to resource positions on user interfaces in a test environment.

FIG. 19 shows a representative method of providing resource locators keyed to resource names and alternatively keyed to resource positions on user interfaces in a test environment. Flowchart 1900 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 19. Multiple actions can be combined in some implementations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of providing resource locators keyed to resource names and alternatively keyed to resource positions on user interfaces in a test environment 1905. The method of providing resource locators also includes providing a central repository for resource locators 1915, storing a set of named alternative locator expressions for a resource in the central repository that includes first resource locators keyed to resource names on user interfaces and second resource locators keyed to resource positions on user interfaces 1935, invoking a resource location navigator for locating the resource using a first resource locator keyed to a resource name on the user interface 1955, and automatically invoking the resource location navigator using the second resource locator keyed to the resource position after failure of locating the resource using the resource name 1975. Other embodiments of this aspect include corresponding computer systems, apparatus, and computer programs recorded on one or more computer storage devices, each configured to perform the actions of the methods.

Figure 20:
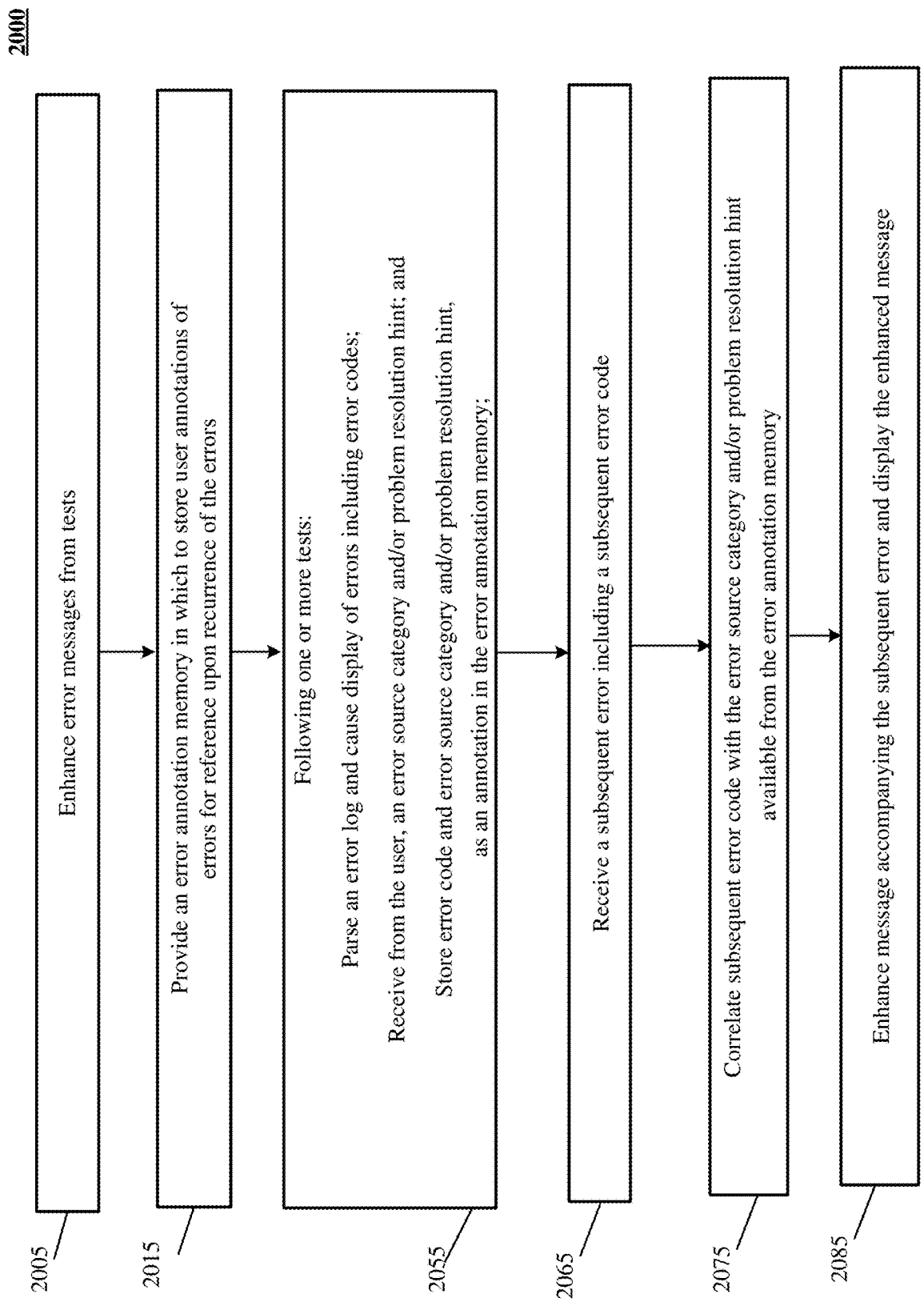
FIG. 20 shows a representative method of enhancing error messages from tests.

FIG. 20 shows a representative method of enhancing error messages from tests. Flowchart 2000 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of enhancing error messages from tests 2005. The method also includes providing an error annotation memory in which to store user annotations of errors for reference upon recurrence of the errors 2015; following one or more tests, parsing an error log and causing display of errors including error codes; receiving from the user, an error source category and/or problem resolution hint, and storing the error source category and/or the problem resolution hint, as an annotation in the error annotation memory 2055. The method also includes receiving a subsequent error including a subsequent error code 2065; and correlating subsequent error codes with the error source category and/or problem resolution hint available from the error annotation memory 2075. Further the method includes enhancing the message accompanying the subsequent error and causing display of the enhanced message 2085. Other embodiments of this aspect include corresponding computer systems, apparatus, and computer programs recorded on one or more computer storage devices, each configured to perform the actions of the methods.

Next, we describe a computer system usable for the end-to-end test automation framework described herein.

Computer System

Figure 21:
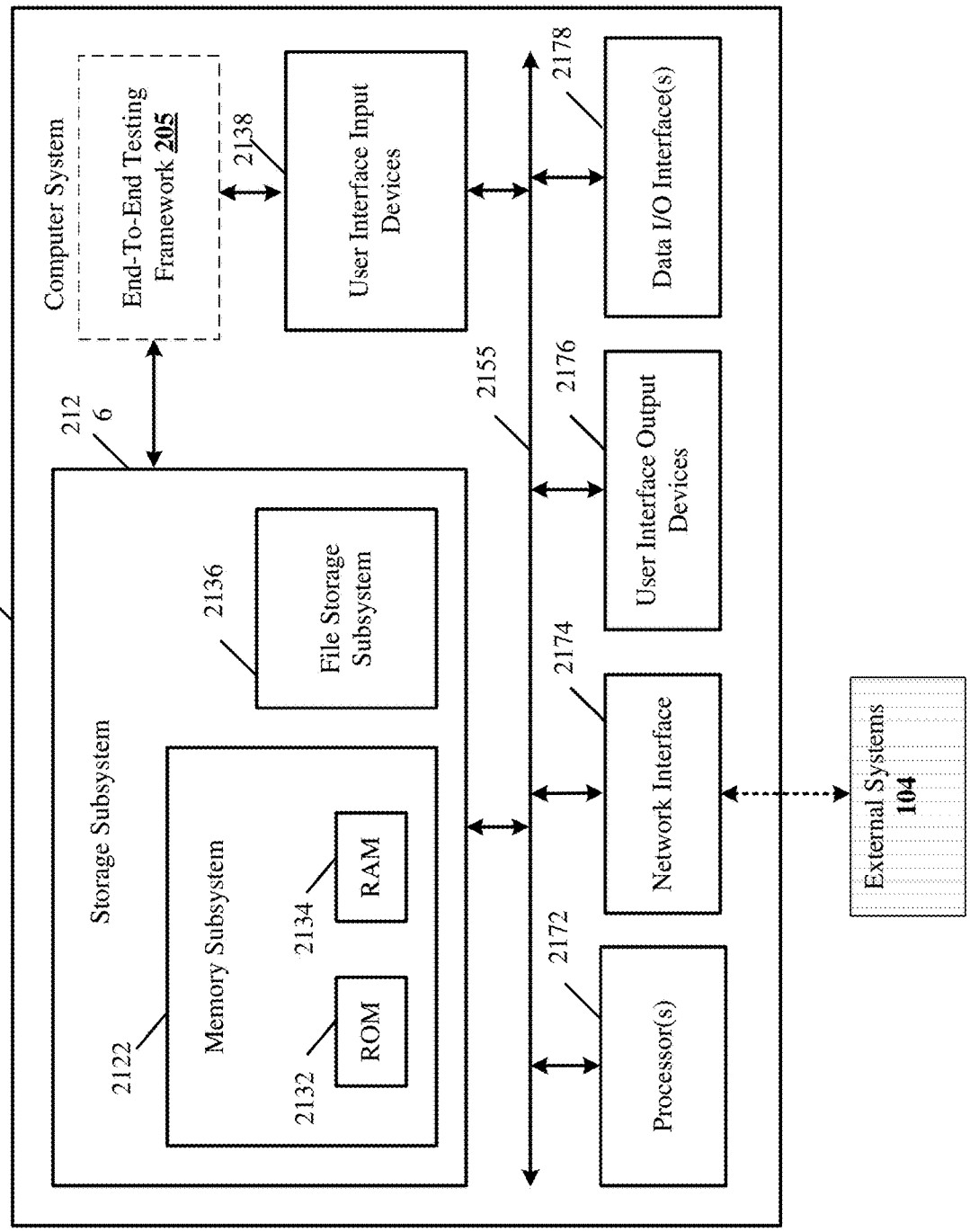
FIG. 21 is a block diagram of an exemplary system for a computer system that can be used for an end-to-end test automation framework with multiple test execution modes, reusable and just-in-time provisioning steps, mapping of a user interface template to API schema, and specification and invocation of alternate and failover resource locators, according to one implementation of the technology disclosed.

FIG. 21 is a simplified block diagram of a computer system 2110 that can be used for an end-to-end test automation framework with multiple test execution modes, reusable and just-in-time provisioning steps, mapping of a user interface template to API schema, and specification and invocation of alternate and failover resource locators. Computer system 2110 can also be used for custom exception handling, according to one implementation of the technology disclosed.

Computer system 2100 includes at least one central processing unit (CPU) 2172 with navigation data generator 105 that communicates with a number of peripheral devices via bus subsystem 2155. These peripheral devices can include a storage subsystem 2126 including, for example, memory devices and a file storage subsystem 2136, user interface input devices 2138, user interface output devices 2176, and a network interface subsystem 2174. The input and output devices allow user interaction with computer system 2100. Network interface subsystem 2174 provides an interface to a communication network 2184, and to corresponding interface devices in other computer systems.

In one implementation, E2E testing framework 205 of FIG. 2 is communicably linked to the storage subsystem 2126 and the user interface input devices 2138 through network interface 2174. User interface input devices 2138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2100.

User interface output devices 2176 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 2100 to the user or to another machine or computer system.

Storage subsystem 2126 stores programming and data constructs that provide the functionality of some or all of the modules and methods described herein.

Memory subsystem 2122 used in the storage subsystem 2110 can include a number of memories including a main random access memory (RAM) 2132 for storage of instructions and data during program execution and a read only memory (ROM) 2134 in which fixed instructions are stored. A file storage subsystem 2136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2136 in the memory subsystem 2122, or in other machines accessible by the processor.

Bus subsystem 2155 provides a mechanism for letting the various components and subsystems of computer system 2100 communicate with each other as intended. Although bus subsystem 2155 is shown schematically as a single bus, alternative implementations of the bus subsystem can use multiple busses.

Computer system 2100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2100 depicted in FIG. 21 is intended only as a specific example for purposes of illustrating the preferred embodiments of the present invention. Many other configurations of computer system 2100 are possible having more or less components than the computer system depicted in FIG. 21.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of efficient testing by selective UI interaction, through test script sections including setup, execution and verification, applied to an application under test (AUT) that operates in both an application programming interface (API) mode and a user interface (UI) mode, includes providing a test environment that, when testing the UI mode of the AUT, defaults to ignoring the UI mode during setup and to supplying setup values stored in a file directly to an API without rendering or interacting with UI elements in the setup section of the test script. The method also includes encountering an override directive in the setup section of the test script, which mandates interaction with a specified UI element in the setup section, and responsive to the override directive, overriding of the default of ignoring the specified UI element in the setup section, rendering the specified UI element, and applying a bot to interact with and supply setup values from the file to the specified UI element.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Many implementations include the bot acting under control of a meta-test script, completing parameters presented by the UI in the UI mode during a setup phase, and updating the API parameters for testing programmatically.

For some implementations of the disclosed method, a test script parser component of the test environment performs the encountering and interpreting of the override directive and the UI directive to be modified, and the causing overriding of the default and invoking of the UI directive.

In many implementations of the disclosed method, a single test script used in the test environment for a particular test supports both the API mode and the UI mode for execution, and choice of an operating mode is controlled via configuration. For many implementations of the disclosed method, the configurable values of the test parameters used to set up the test are maintained in a data structure accessed during both the API mode and the UI mode of execution of the test script. The configurable values of the test parameters used to set up the test are maintained in a data structure accessed during both the API mode and the UI mode of execution of the test script and the data structure is modified with the configurable values of the test parameters received via the UI, in many implementations.

The test setup stage, among the test stages of setup, execution and verification, includes programmatically setting up hardware to be used by the test scripts before running the tests. In one implementation, ignoring UI directives during the setup stage is a best practice for replicability of test parameters used during the test.

In one implementation, a disclosed method of utilizing already provisioned components in a test scenario, without need to purge and re-provision the already provisioned components, includes interpreting first and second sections of a test script. In the first section, the method includes encountering a reusable-resource-tag and a first instance of requesting provisioning of an associated resource, and provisioning the associated resource and designating the associated resource as reusable. In the second section, the disclosed method includes encountering a second instance of requesting provisioning of the associated resource, determining that the associated resource was designated as being reusable, and reusing an already provisioned instance of the associated resource instead of provisioning a new instance and instead of destroying the already provisioned instance and re-provisioning the associated resource.

Some implementations of the disclosed method include extending test scripting to specification of whether a provisioned test component is reusable: providing a test script interpreter that checks the test script to determine whether an associated resource has already been provisioned in a current test session, the test script interpreter encountering the second instance of requesting provisioning of the associated resource and determining that the associated resource was designated as being reusable.

In one implementation, the test scripting language utilizes one of a declaration of reusability and a property flag for declaring a component reusable, and the disclosed method also includes maintaining a reusability state parameter that indicates whether a provisioned resource is reusable and setting the state parameter for the associated resource when it is provisioned. In some cases, the disclose method further includes checking the value of the state parameter of the associated resource when processing the second instance of the request for provisioning of the associated resource.

In one implementation, a disclosed method of testing with a test parameter data structure, applied to an application under test (AUT) that operates in both an application programming interface (API) mode and a user interface (UI) mode includes processing a test script that is configurable to test the AUT in the API mode and also in the UI mode. The UI mode renders and interacts with UI elements utilizing test values stored in elements of the test parameter data structure, and the test parameter data structure is used by the test script in both the API mode and in the UI mode. The disclosed method also includes providing display mark-up in the test script that is rendered in the UI mode and that formats fields in a display or parts of the display to receive data that map to specific elements in the test parameter data structure, but which display mark-up leaves to be completed a mapping connection between the fields in the display and the specific elements in the test parameter data structure. The method further includes providing a data mapping that maps the fields in the display mark-up to the elements in the test parameter data structure, based on names of the elements. While processing the test script in the UI mode, the method includes rendering the display mark-up from the test script, using a bot to interact with and complete the display mark-up, applying the data mapping to identify the elements in the test parameter data structure to be used to complete the fields in the display mark-up, and causing processing of the completed fields in the display mark-up.

The disclosed framework offers an ability to combine both API and UI use-cases into one single test case, also referred to as a scenario, if both the use-cases would have that level of commonalities. To even make it easier for the test developer, the disclosed framework offers a mapping for test parameters between API (JSON data structure) and UI (hierarchical field based structure), so the commonality increases and the same step can be used for both API and UI in the scenario.

For many implementations of the disclosed method, the fields in the display mark-up include labels and the data mapping maps the labels to fully qualified names of the elements, and in some cases the disclosed method also includes reusable display mark-up in modules that can be included in UI instances. In some implementations, the display mark-up is reusable for future tests.

One implementation of the disclosed method includes determining that the UI mode has been selected for at least one test in a suite or scenario and operating in the UI mode.

In one implementation, a disclosed method of providing resource locators keyed to resource names with failover alternate resource locators keyed to resource positions on user interfaces in a test environment includes providing a central repository for resource locators and storing a set of alternative locator expressions for a resource in the central repository. The set includes first resource locators keyed to resource names on user interfaces and respective second resource locators keyed to resource positions on user interfaces that can be evaluated when the resource name in the respective first resource locator is invalid. The method also includes invoking a resource location navigator to locate a particular resource using a first resource locator keyed to a resource name on the user interface, automatically invoking the resource location navigator using the second resource locator keyed to the resource position after failure of locating the particular resource using the resource name, and accessing the particular resource using the second resource locator. If the particular resource is not located using the second resource locator, subsequent locators can be utilized until the locator is accessed, in one implementation.

Some implementations of the disclosed method further include specifying a failover resource locator from the set of defined alternative locator expressions for the resource, when the resource is not found using the alternate resource locator. For some implementations, the disclosed method also includes automatically invoking the resource location navigator using the failover resource locator when the resource is not located using the alternate resource locator.

For one implementation of the disclosed method, the alternate resource locator utilizes an XPath expression. In another case, the alternate resource locator utilizes a cascading style sheet (CSS) selector. Other implementations further include successively specifying additional locator expressions.

Many implementations of the disclosed method further include an error handler for providing error results when none of the available locator expressions succeeds.

In one implementation, a disclosed method of enhancing error messages from tests includes providing an error annotation memory in which to store annotations of errors for reference upon recurrence of the errors. The method also includes, following one or more tests, parsing an error log and causing display to the user of one or more errors including error codes, and receiving from the user, for at least some of the errors, a respective error source category and/or problem resolution hint and storing an error code and the respective error source category and/or problem resolution hint, received from the user, as an annotation in the error annotation memory. The disclosed method further includes receiving a subsequent error including a subsequent error code, correlating a subsequent error code with the error source category and/or problem resolution hint available from the error annotation memory, and enhancing a message accompanying the subsequent error and causing display of the enhanced message. A globally unique error message can be treated as an error code. More often, codes are assigned to error messages to ensure global uniqueness. Abbreviated error codes tend to be favored.

Some implementations of the disclosed method also include providing a custom exception handler that listens for intercepting exceptions.

One implementation further includes causing display to the user of the error reported with the intercepted exception and the current error source category and/or in the current problem resolution hint found in the error annotation memory. In some cases, the disclosed method further includes receiving from the user, and storing, an update to the current error source category and/or in the current problem resolution hint displayed with the intercepted exception.

Some implementations of the disclosed method also include storing at least part of a system's state information with the stored current error source category and/or problem solution hint received from the user and causing display of the stored system state information during subsequent error annotation.

For some disclosed implementations, the intercepted exception is assigned to at least one source category among automation, environment and virtual service assurance (VSA) error sources. The disclosed method can further include categorizing the problem resolution hints for the intercepted exceptions as at least one of device among resolving DUT test issues, test environment issues and test automation issues. In many cases, the problem resolution hints codify knowledge or error resolutions for the intercepted exceptions. Some implementations of the disclosed method also include updating the problem resolution hint with a subsequent insight.

In another implementation, a disclosed system includes one or more processors coupled to memory, the memory loaded with computer instructions, when executed on the processors, implement any of the disclosed methods.

In yet another implementation a disclosed tangible non-transitory computer readable storage media is impressed with computer program instructions that, when executed on a processor, implement any of the disclosed methods.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of providing resource locators keyed to resource names with failover alternate resource locators keyed to resource positions on user interfaces in a test environment, the method including:
   providing a central repository for resource locators;
   storing a set of alternative locator expressions for a resource in the central repository, wherein the set includes first resource locators keyed to resource names on user interfaces and respective second resource locators keyed to resource positions on user interfaces that can be evaluated when the resource name in the first resource locator is invalid;
   invoking a resource location navigator to locate a particular resource using a first resource locator keyed to a resource name on the user interface; and
   automatically invoking the resource location navigator using the second resource locator keyed to the resource position after failure of locating the particular resource using the resource name; and
   accessing the particular resource using the second resource locator.

2. The method of claim 1, further including specifying a failover resource locator from the set of alternative locator expressions defined for the resource, when the resource is not found using the alternate resource locator.

3. The method of claim 2, further including automatically invoking the resource location navigator using the failover resource locator when the resource is not located using the alternate resource locator.

4. The method of claim 1, wherein the alternate resource locator utilizes an XPath expression.

5. The method of claim 1, wherein the alternate resource locator utilizes a cascading style sheet (abbreviated CSS) selector.

6. The method of claim 1, further including successively specifying additional locator expressions.

7. The method of claim 1, further including an error handler for providing error results when none of the locator expressions that are available succeeds.

8. A tangible non-transitory computer readable storage media impressed with computer program instructions that, when executed, provide resource locators keyed to resource names with failover alternate resource locators keyed to resource positions on user interfaces in a test environment, including:
   providing a central repository for resource locators;
   storing a set of alternative locator expressions for a resource in the central repository, wherein the set includes first resource locators keyed to resource names on user interfaces and respective second resource locators keyed to resource positions on user interfaces that can be evaluated when the resource name in the first resource locator is invalid;
   invoking a resource location navigator to locate a particular resource using a first resource locator keyed to a resource name on the user interface; and
   automatically invoking the resource location navigator using the second resource locator keyed to the resource position after failure of locating the particular resource using the resource name; and
   accessing the particular resource using the second resource locator.

9. The tangible non-transitory computer readable storage media of claim 8, further including specifying a failover resource locator from the set of alternative locator expressions defined for the resource, when the resource is not found using the alternate resource locator.

10. The tangible non-transitory computer readable storage media of claim 9, further including automatically invoking the resource location navigator using the failover resource locator when the resource is not located using the alternate resource locator.

11. The tangible non-transitory computer readable storage media of claim 8, wherein the alternate resource locator utilizes an XPath expression.

12. The tangible non-transitory computer readable storage media of claim 8, wherein the alternate resource locator utilizes a cascading style sheet (abbreviated CSS) selector.

13. The tangible non-transitory computer readable storage media of claim 8, further including successively specifying additional locator expressions.

14. The tangible non-transitory computer readable storage media of claim 8, further including an error handler for providing error results when none of the locator expressions that are available succeeds.

15. A system for providing resource locators keyed to resource names with failover alternate resource locators keyed to resource positions on user interfaces in a test environment, the system including a processor, memory coupled to the processor, and computer instructions for providing, storing, invoking from the non-transitory computer readable storage media of claim 8 loaded into the memory.

16. The system of claim 15, further including specifying a failover resource locator from the set of alternative locator expressions defined for the resource, when the resource is not found using the alternate resource locator.

17. The system of claim 16, further including automatically invoking the resource location navigator using the failover resource locator when the resource is not located using the alternate resource locator.

18. The system of claim 15, wherein the alternate resource locator utilizes an XPath expression.

19. The system of claim 15, wherein the alternate resource locator utilizes a cascading style sheet (abbreviated CSS) selector.

20. The system of claim 15, further including successively specifying additional locator expressions.

21. The system of claim 15, further including an error handler for providing error results when none of the locator expressions that are available succeeds.

* * * * *